(12) United States Patent
Miyake et al.

(10) Patent No.: US 10,033,904 B2
(45) Date of Patent: Jul. 24, 2018

(54) INFORMATION PROCESSING APPARATUS FOR MULTIPLEXING INFORMATION IN AN IMAGE, INFORMATION PROCESSING METHOD, AND STORAGE MEDIUM STORING PROGRAM

(71) Applicant: CANON KABUSHIKI KAISHA, Tokyo (JP)

(72) Inventors: Nobutaka Miyake, Yokohama (JP); Yuki Ishida, Kawasaki (JP); Wei Song, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/270,278

(22) Filed: Sep. 20, 2016

(65) Prior Publication Data

US 2017/0099408 A1   Apr. 6, 2017

(30) Foreign Application Priority Data

Oct. 6, 2015 (JP) ................................. 2015-198926
Oct. 6, 2015 (JP) ................................. 2015-198927

(51) Int. Cl.
*H04N 1/32* (2006.01)

(52) U.S. Cl.
CPC ....... *H04N 1/3224* (2013.01); *H04N 1/32144* (2013.01); *H04N 1/32299* (2013.01); *H04N 1/32325* (2013.01); *H04N 2201/3266* (2013.01); *H04N 2201/3269* (2013.01); *H04N 2201/3271* (2013.01); *H04N 2201/3273* (2013.01)

(58) Field of Classification Search
None
See application file for complete search history.

(56) References Cited

U.S. PATENT DOCUMENTS

| 6,600,828 | B1 * | 7/2003 | Kawamura | ........... G06T 1/0035 |
| | | | | 382/100 |
| 6,603,864 | B1 * | 8/2003 | Matsunoshita | ....... G06T 1/0028 |
| | | | | 382/100 |
| 6,741,758 | B2 | 5/2004 | Hayashi et al. | |
| 6,959,385 | B2 | 10/2005 | Murakami et al. | |
| 7,058,232 | B1 | 6/2006 | Miyake | |
| 7,072,522 | B2 | 7/2006 | Miyake et al. | |
| 7,079,267 | B2 | 7/2006 | Umeda et al. | |
| 7,171,019 | B2 | 1/2007 | Miyake et al. | |
| 7,187,476 | B2 | 3/2007 | Umeda et al. | |
| 7,536,026 | B2 | 5/2009 | Kaneda et al. | |
| 7,660,020 | B2 | 2/2010 | Ishii | |
| 7,773,266 | B2 | 8/2010 | Umeda et al. | |
| 2003/0210803 | A1 | 11/2003 | Kaneda et al. | |
| 2008/0232639 | A1 * | 9/2008 | Ishikawa | ............ H04N 1/32133 |
| | | | | 382/100 |

(Continued)

FOREIGN PATENT DOCUMENTS

JP   2005-026797 A    1/2005
JP   2006-345017 A   12/2006

*Primary Examiner* — Thomas D Lee
(74) *Attorney, Agent, or Firm* — Fitzpatrick, Cella, Harper & Scinto

(57) ABSTRACT

Pieces of information are multiplexed in a plurality of portions on an image respectively. Image information which sets an edge amount becomes equal to or larger than a threshold is multiplexed in a portion of the plurality of portions where an edge amount is smaller than the threshold.

22 Claims, 21 Drawing Sheets

(56) References Cited

U.S. PATENT DOCUMENTS

2009/0021794 A1* 1/2009 Hara .................. G06T 1/0071
358/3.28
2010/0067736 A1* 3/2010 Kihara ............... G06T 1/0028
382/100

* cited by examiner

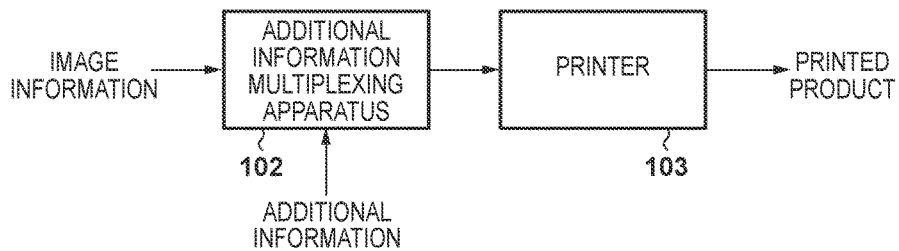
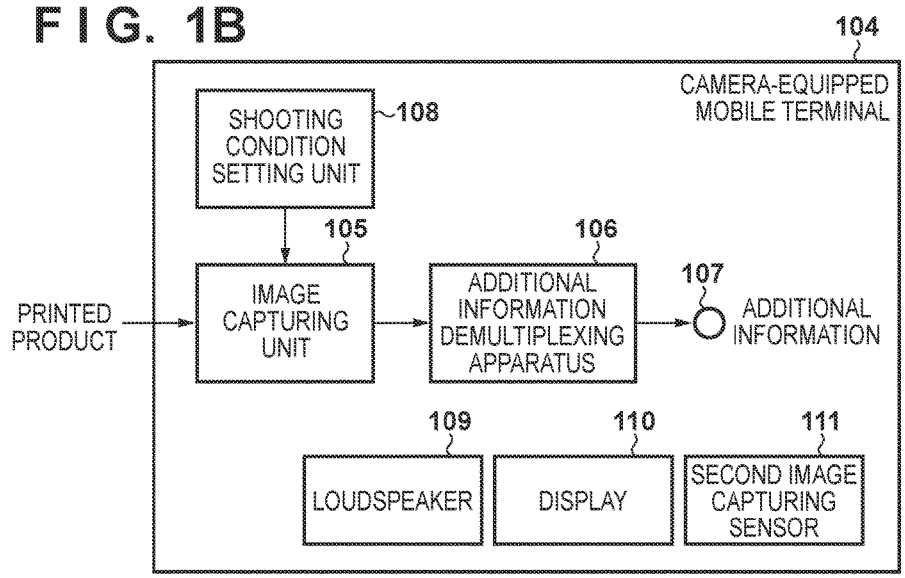
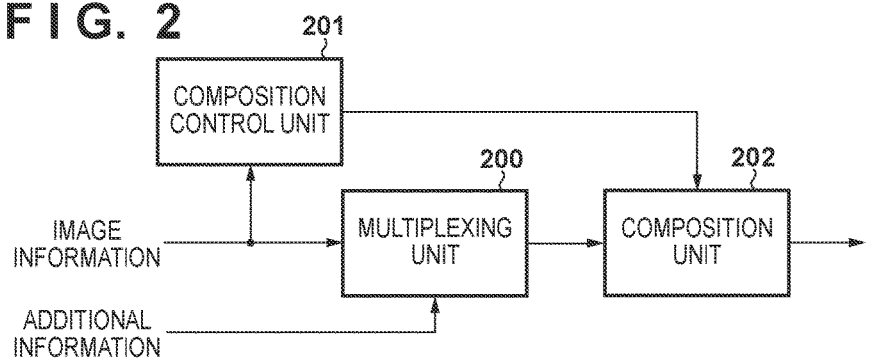

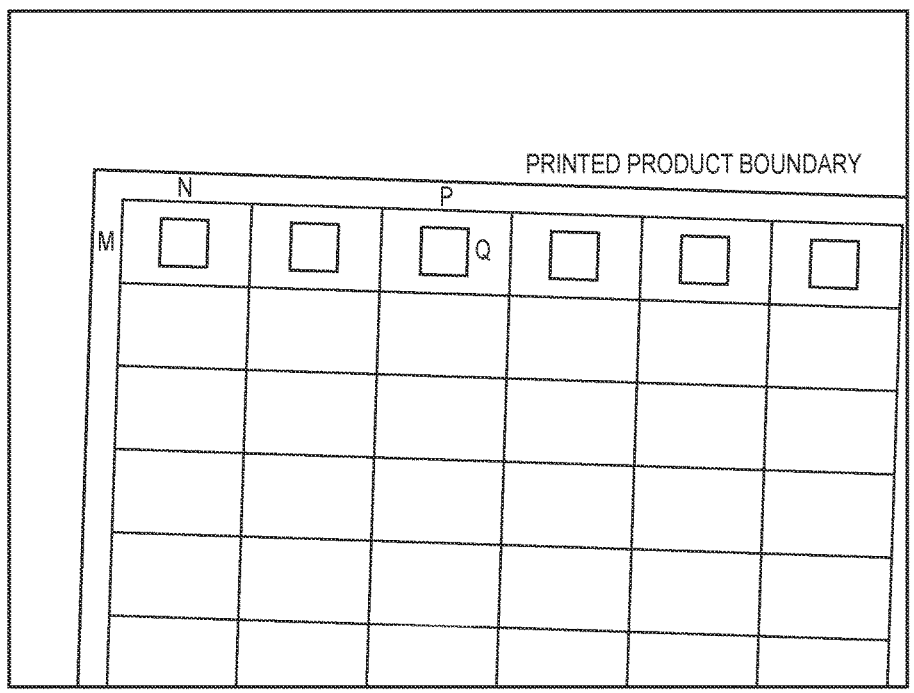

FIG. 13

| 3 | 3 | 2 | 2 | 1 | 1 | 0 | 0 | 3 | 3 | 2 | 2 | 1 | 1 | 0 | 0 |
|---|---|---|---|---|---|---|---|---|---|---|---|---|---|---|---|
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |

FIG. 14

| 3 | 2 | 1 | 0 | 3 | 2 | 1 | 0 | 3 | 2 | 1 | 0 | 3 | 2 | 1 | 0 |
|---|---|---|---|---|---|---|---|---|---|---|---|---|---|---|---|
| 3 | 2 | 1 | 0 | 3 | 2 | 1 | 0 | 3 | 2 | 1 | 0 | 3 | 2 | 1 | 0 |
| 2 | 1 | 0 | 3 | 2 | 1 | 0 | 3 | 2 | 1 | 0 | 3 | 2 | 1 | 0 | 3 |
| 2 | 1 | 0 | 3 | 2 | 1 | 0 | 3 | 2 | 1 | 0 | 3 | 2 | 1 | 0 | 3 |
| 1 | 0 | 3 | 2 | 1 | 0 | 3 | 2 | 1 | 0 | 3 | 2 | 1 | 0 | 3 | 2 |
| 1 | 0 | 3 | 2 | 1 | 0 | 3 | 2 | 1 | 0 | 3 | 2 | 1 | 0 | 3 | 2 |
| 0 | 3 | 2 | 1 | 0 | 3 | 2 | 1 | 0 | 3 | 2 | 1 | 0 | 3 | 2 | 1 |
| 0 | 3 | 2 | 1 | 0 | 3 | 2 | 1 | 0 | 3 | 2 | 1 | 0 | 3 | 2 | 1 |
| 3 | 2 | 1 | 0 | 3 | 2 | 1 | 0 | 3 | 2 | 1 | 0 | 3 | 2 | 1 | 0 |
| 3 | 2 | 1 | 0 | 3 | 2 | 1 | 0 | 3 | 2 | 1 | 0 | 3 | 2 | 1 | 0 |
| 2 | 1 | 0 | 3 | 2 | 1 | 0 | 3 | 2 | 1 | 0 | 3 | 2 | 1 | 0 | 3 |
| 2 | 1 | 0 | 3 | 2 | 1 | 0 | 3 | 2 | 1 | 0 | 3 | 2 | 1 | 0 | 3 |
| 1 | 0 | 3 | 2 | 1 | 0 | 3 | 2 | 1 | 0 | 3 | 2 | 1 | 0 | 3 | 2 |
| 1 | 0 | 3 | 2 | 1 | 0 | 3 | 2 | 1 | 0 | 3 | 2 | 1 | 0 | 3 | 2 |
| 0 | 3 | 2 | 1 | 0 | 3 | 2 | 1 | 0 | 3 | 2 | 1 | 0 | 3 | 2 | 1 |
| 0 | 3 | 2 | 1 | 0 | 3 | 2 | 1 | 0 | 3 | 2 | 1 | 0 | 3 | 2 | 1 |

INFORMATION PROCESSING APPARATUS FOR MULTIPLEXING INFORMATION IN AN IMAGE, INFORMATION PROCESSING METHOD, AND STORAGE MEDIUM STORING PROGRAM

BACKGROUND OF THE INVENTION

Field of the Invention

The present invention relates to a technique for multiplexing information in an image.

Description of the Related Art

There has been conventionally proposed a technique of embedding information in a printed product so the information does not visually stand out (to be referred to as "invisible" hereinafter). This technique called a digital watermark or steganography has been developed rapidly in recent years.

Japanese Patent Laid-Open No. 2005-26797 discloses a method of adding a correction marker to provide geometric transformation resistance when a printed product is read by a scanner or camera apparatus, and executing printing.

However, according to Japanese Patent Laid-Open No. 2005-26797, there is a phenomenon of a field curvature aberration in which the edge portion of a printed product blurs if the central portion of the printed product is in focus at the time of close-up shooting. Especially, the edge portion of the printed product when the central portion of the printed product is in focus is largely influenced by not only the field curvature aberration but also other Seidel's aberrations, and it is thus impossible to acquire a satisfactory analysis image necessary to extract information. To satisfactorily acquire an image of the entire printed product, there is provided a method of performing appropriate focusing for each region of the printed product, and acquiring an analysis image by bracket shooting composition. However, for example, if a contrast AF (Auto Focus) method incorporated in many camera-equipped mobile phones and smartphones is used, an edge part necessary for AF does not always exist in the edge portion of an image, and it is often difficult to perform focusing.

SUMMARY OF THE INVENTION

An aspect of the present invention is to eliminate the above-mentioned problems with the conventional technology. The present invention provides a technique for multiplexing information in an image to be printed so that the information can be satisfactorily extracted.

The present invention in one aspect provides an information processing method comprising: performing first multiplexing of multiplexing pieces of information in a plurality of portions on an image respectively; and performing second multiplexing of multiplexing, in a portion of the plurality of portions where an edge amount is smaller than a threshold, image information which sets the edge amount to be equal to or more than the threshold.

According to an arrangement of the present invention, it is possible to multiply information in an image to be printed so that the information can be satisfactorily extracted.

Further features of the present invention will become apparent from the following description of exemplary embodiments with reference to the attached drawings.

BRIEF DESCRIPTION OF THE DRAWINGS

FIG. 1A is a block diagram showing an example of the configuration of a system;

FIG. 1B is a block diagram showing an example of the arrangement of a camera-equipped mobile terminal;

FIG. 2 is a block diagram showing an example of the arrangement of an additional information multiplexing apparatus;

FIG. 9 is a view showing an example of a captured image of a printed product;

FIGS. 10A and 10B are views each showing an example of a spatial filter;

FIG. 13 is a view showing a thinning method in a table format;

FIG. 14 is a view showing a thinning method in a table format;

DESCRIPTION OF THE EMBODIMENTS

Figure 3:
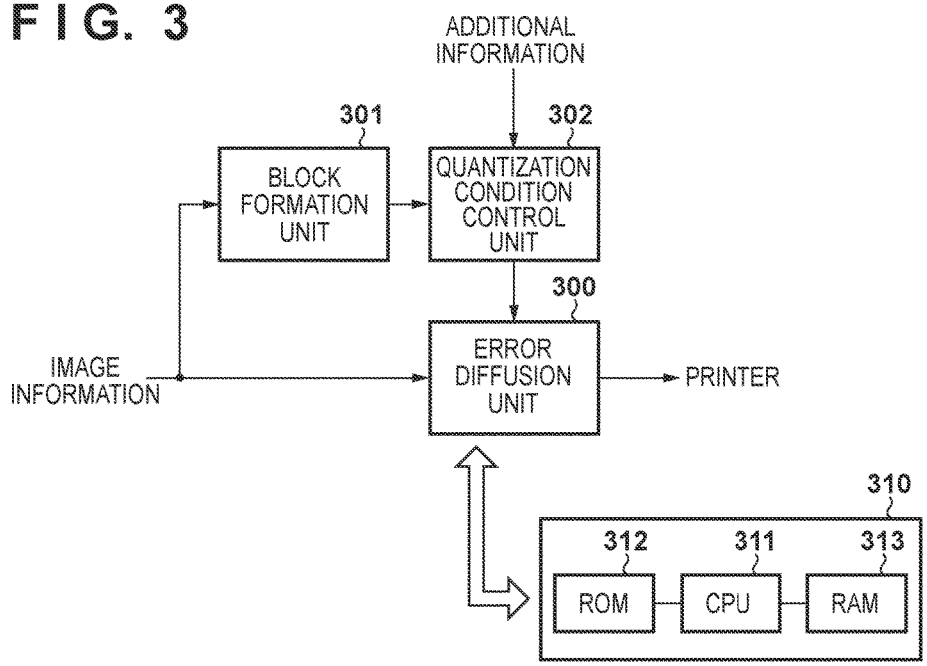
FIG. 3 is a block diagram showing an example of the arrangement of a multiplexing unit.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components and a description thereof will be omitted.

In this specification, the term "print" not only includes the formation of significant information such as characters and graphics, but also broadly includes the formation of images, figures, patterns, and the like on a printing medium, or the processing of the medium, regardless of whether they are significant or insignificant and whether they are so visualized as to be visually perceivable by humans.

Furthermore, the term "printing medium" not only includes paper used in common printing apparatuses, but also broadly includes materials, such as cloth, a plastic film, a metal plate, glass, ceramics, wood, and leather, capable of accepting ink.

First Embodiment

An additional information multiplexing apparatus will be described below as an example of an information processing apparatus which multiplexes information in each of a plurality of portions on an image, respectively (first multiplexing), and multiplexes image information, which sets an edge amount to be equal to or larger than a threshold, in a portion of the plurality of portions where the edge amount is smaller than the threshold (second multiplexing).

An additional information demultiplexing apparatus as an example of an image capturing apparatus having the following arrangement will be described below. In a printed product printed with a multiplexed image obtained by multiplexing pieces of information obtained by dividing information in a plurality of portions on an image, respectively, and multiplexing image information, which sets an edge amount to be equal to or larger than a threshold, in a portion of the plurality of portions where the edge amount is smaller than the threshold, captured images of regions corresponding to the plurality of portions are acquired. The above pieces of information are then extracted from the captured images.

An additional information multiplexing apparatus which embeds (multiplexes) additional information in image information as a print image (including images and characters to be printed) will be described first. Note that the additional information multiplexing apparatus may be installed in a computer as printer driver software or application software in the computer for generating a print image (image information) to be output to a printer engine mounted in a printer, a multifunctional peripheral, or the like. The additional information multiplexing apparatus may be incorporated in a copying machine, a facsimile, a printer main body, or the like as hardware and/or software.

FIG. 1A is a block diagram showing an example of the configuration of a system for embedding additional information in a printed product and outputting the printed product, which includes such additional information multiplexing apparatus.

An additional information multiplexing apparatus 102 receives a monochromatic or multi-tone print image (image information), and additional information as information to be embedded in the print image. The additional information is information different from the image information, and includes, for example, voice information, moving image information, text information, pieces of image attribution information such as the copyright, shooting date & time, shooting location, and user regarding the image information, and other image information different from the image information.

The additional information multiplexing unit 102 embeds pieces of additional information obtained by dividing additional information in a plurality of portions on the print image, respectively, so as to be difficult to visually discriminate the pieces of embedded additional information. The additional information multiplexing apparatus 102 sends the print image embedded with the additional information to a printer 103.

The printer 103 is a printer for implementing a halftoning expression using pseudo-halftoning, for example, an inkjet printer or a laser printer, and is a printing apparatus for generating a printed product by printing the print image from the additional information multiplexing apparatus 102 on a printing medium such as paper. Another apparatus having a print function such as a multifunctional peripheral may be adopted as long as it prints the print image from the additional information multiplexing apparatus 102 on a printing medium such as paper.

An example of the arrangement of the above-described additional information multiplexing apparatus 102 will be described with reference to a block diagram shown in FIG. 2.

A multiplexing unit 200 receives the above-described image information and additional information. The multiplexing unit 200 embeds pieces of additional information obtained by dividing the additional information in a plurality of portions on the print image, respectively, as described above. At this time, the multiplexing unit 200 embeds the additional information so as to be difficult to visually discriminate the embedded additional information.

A composition control unit 201 determines whether, among regions in which the multiplexing unit 200 multiplexes the pieces of additional information, there is a region on which a camera-equipped mobile terminal 104 is difficult to be focused. If there is such region, the composition control unit 201 outputs the image to be multiplexed in the region to a composition unit 202 as an artificial image.

When the composition control unit 201 outputs the artificial image, the composition unit 202 multiplexes the artificial image in a corresponding region in the image information multiplexed by the multiplexing unit 200, and outputs the multiplexed image information to the printer 103. On the other hand, if no artificial image is output from the composition control unit 201, the composition unit 202 directly outputs, to the printer 103, the image information multiplexed by the multiplexing unit 200.

An example of the arrangement of the above-described multiplexing unit 200 will be explained with reference to a block diagram shown in FIG. 3.

An error diffusion unit 300 performs pseudo-halftoning using an error diffusion method to convert the input print image into a quantization level lower than the number of input tones, thereby performing conversion into a print image areally expressing the tonality based on the quantized values of a plurality of pixels. Details of error diffusion processing will be described later. The error diffusion unit 300 sends the print image having undergone the pseudo-halftoning to the printer 103.

A block formation unit 301 divides the input print image into a plurality of regions (forms a plurality of blocks). Note that the divided regions may have a rectangular shape or other shapes. For example, the print image may be divided into regions each having the same attributes (regions of respective objects or the like).

A quantization condition control unit 302 controls the quantization condition of each block divided by the block formation unit 301. The quantization condition is used in the error diffusion unit 300.

A control unit 310 controls the operations of the respective functional units forming the additional information multiplexing apparatus 102, and executes or controls respective processes to be described later as processes performed by the additional information multiplexing apparatus 102. The control unit 310 includes a ROM 312, a CPU 311, and a RAM 313.

The CPU 311 executes processing using computer programs and data stored in the ROM 312 and the RAM 313. Thus, the CPU 311 controls the operations of the respective units of the additional information multiplexing apparatus 102, and executes or controls the respective processes to be described later as processes performed by the additional information multiplexing apparatus 102.

The ROM 312 stores setting data of the additional information multiplexing apparatus 102, and computer programs and data for causing the CPU 311 to execute or control the respective processes to be described later as processes performed by the additional information multiplexing apparatus 102.

The RAM 313 includes a work area to be used by the CPU 311 to execute various processes.

Figure 4:
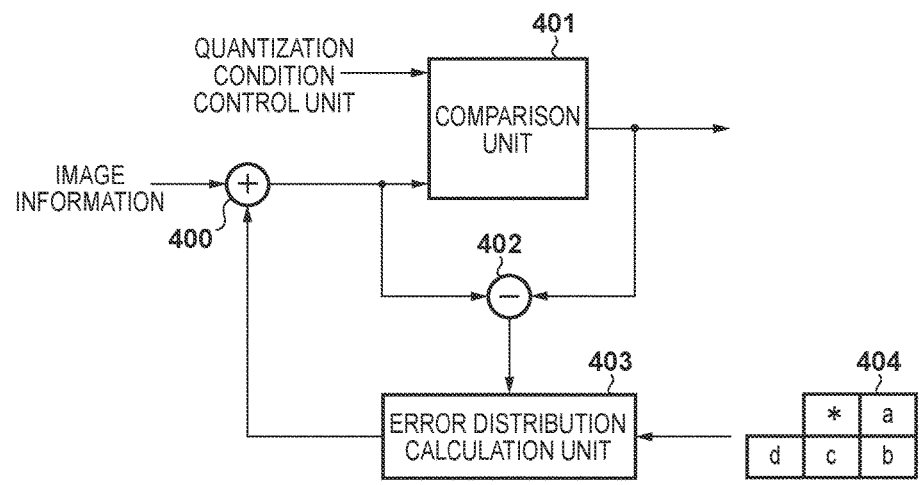
FIG. 4 is a block diagram showing an example of the arrangement of an error diffusion unit.

An example of the arrangement of the error diffusion unit 300 will be described with reference to a block diagram shown in FIG. 4. For the sake of simplicity, error diffusion processing in which the quantized value is binary will be exemplified.

An adder 400 receives the pixel value of each pixel of a print image, and adds, to the pixel value of the pixel, "the distributed quantization error of an already binarized peripheral pixel of the pixel" supplied from an error distribution calculation unit 403.

A comparison unit 401 compares the pixel value of a pixel of interest output from the adder 400 with a threshold for the pixel of interest in the quantization condition determined by the quantization condition control unit 302 for a block to which the pixel of interest belongs. If the pixel value of the pixel of interest output from the adder 400 is larger than the threshold, "1" is output as the quantized value of the pixel of interest; otherwise, "0" is output as the quantized value of the pixel of interest. Note that if the print image is an image expressing tonality at 8-bit accuracy (an image (8-bit image) in which the pixel value of each pixel is expressed by 8 bits), a quantization representative value corresponding to the quantized value "1" is "255" and a quantization representative value corresponding to the quantized value "0" is "0".

As described above, the quantized value "1" or "0" is determined for each pixel of the print image. However, a pixel having the quantized value "1" is printed (a corresponding dot is printed) (using ink, toner, or the like), and a pixel having the quantized value "0" is not printed.

A subtracter 402 obtains, as an error for the pixel of interest, the difference between the pixel value of the pixel of interest output from the adder 400 and the quantization representative value corresponding to the quantized value of the pixel of interest output from the comparison unit 401.

The error distribution calculation unit 403 distributes, to the peripheral pixels of the pixel of interest, the error obtained by the subtracter 402 for the pixel of interest. A distribution table 404 of errors experimentally set based on relative distances to the pixel of interest is held in advance for the error distribution ratio. The error is distributed based on the distribution ratio described in the distribution table 404. The distribution table 404 shown in FIG. 4 is a distribution table for four peripheral pixels, but is not limited to this.

A series of processes in which the additional information multiplexing apparatus 102 with the above-described arrangement sets a quantization condition for each block of a print image, and performs error diffusion for each block based on the quantization condition will be described next with reference to a flowchart shown in FIG. 5. Note that the flowchart shown in FIG. 5 does not illustrate block division of a print image by the block formation unit 301 but block division need to be performed before step S503.

<Step S501>
The CPU 311 initializes, to 0, the value of a variable i indicating the pixel position (x-coordinate value) in the vertical direction of the print image.

<Step S502>
The CPU 311 initializes, to 0, the value of a variable j indicating the pixel position (y-coordinate value) in the horizontal direction of the print image. Assume that the position at the upper left corner of the print image is set as an origin (0, 0), the x-coordinate value increases in an image right direction, and the y-coordinate value increases in an image downward direction. In the following processing, however, if all the pixel positions on the print image can be scanned, the initial values of the variables i and j and the scan directions are not limited to them.

<Step S503>
The quantization condition control unit 302 determines whether a pixel at a pixel position (i, j) in the print image belongs to a region (multiplexing region) where a code is to be multiplexed. The multiplexing region will be described with reference to an example shown in FIG. 6.

Reference numeral 600 denotes an entire print image which has a size in the vertical direction=HEIGHT and a size in the horizontal direction=WIDTH. Each rectangle segmented by dotted lines within the print image 600 expresses each block divided by the block formation unit 301, and has a size in the vertical direction=M pixels and a size in the horizontal direction=N pixels. Note that M represents a natural number satisfying "2≤M<HEIGHT", and N represents a natural number satisfying "2≤N<WIDTH". Note that in FIG. 6, the blocks are formed using the origin of the print image 600 as a reference point. However, blocks may be formed using, as a reference point, a point different from the origin.

Figure 6:
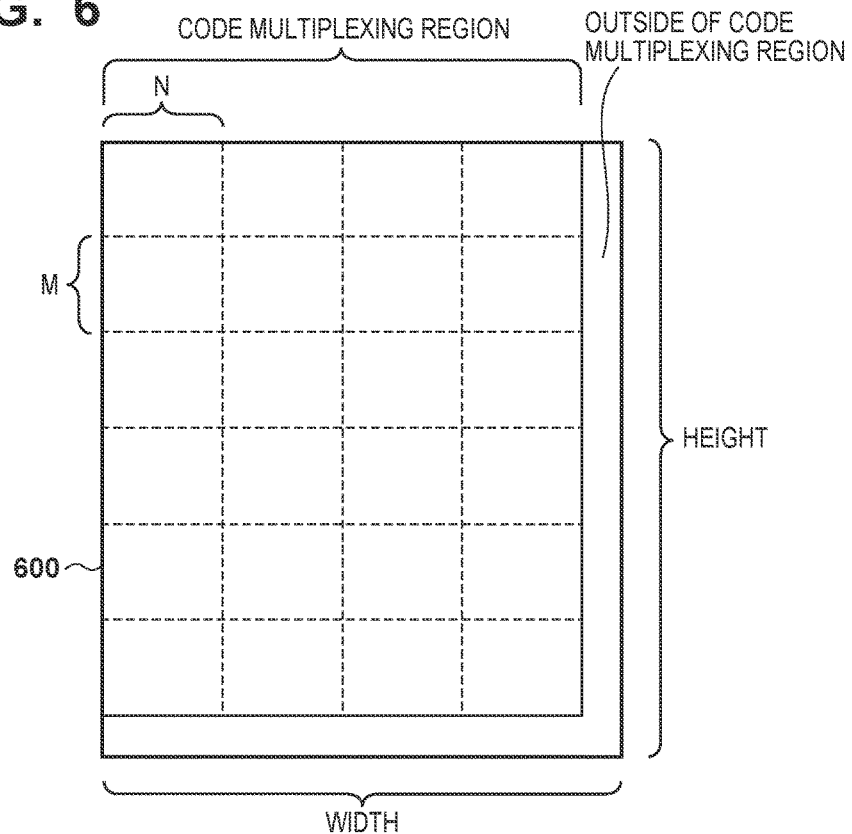
FIG. 6 is a view for explaining a multiplexing region.

If the blocks are formed using the origin of the print image 600 as a reference point, as shown in FIG. 6, a block count W in the horizontal direction is given by INT(WIDTH/N), and a block count H in the vertical direction is given INT(HEIGHT/M) where INT(X) is a function of returning the integer part of X. As shown in FIG. 6, when the W blocks are aligned in the horizontal direction and the H blocks are aligned in the vertical direction from the origin of the print image 600, a region (non-block region) where no blocks exist is generated at the right and lower ends of the print image 600. In this embodiment, assume that the regions of the respective blocks are set as a multiplexing region and a non-block region is set as a non-multiplexing region.

That is, in step S503, a specific block including the pixel position (i, j) in the print image (whether the pixel position (i, j) falls within the multiplexing region) is determined. If it is determined that the pixel position (i, j) in the print image is a pixel position within the multiplexing region, the process advances to step S505; otherwise, the process advances to step S504.

<Step S504>

The quantization condition control unit 302 sets quantization condition C as a quantization condition. Quantization condition C will be described later.

<Step S505>

The quantization condition control unit 302 acquires a code assigned to the block to which the pixel position (i, j) in the print image belongs. For example, an array with elements the number of which is equal to the block count and in which bit values respectively for the corresponding blocks are registered is created, and the bit value registered in the element corresponding to the block to which the pixel position (i, j) in the print image belongs is acquired. In the case of FIG. 6, since the block count is "6 in the vertical direction×4 in the horizontal direction=24", a one-dimensional array CODE[ ] with 24 elements is generated. In CODE[0], CODE[1], . . . , CODE[23], a bit value corresponding to the 0th block, that corresponding to the first block, . . . , and that corresponding to the 23rd block are registered. Note that this array may be a two-dimensional array of 6×4.

The quantization condition control unit 302 then acquires, from the array CODE, a bit value bit registered in the element corresponding to the block to which the pixel position (i, j) in the print image belongs. The bit value bit registered in the element corresponding to the block to which the pixel position (i, j) in the print image belongs is acquired from the array CODE, given by:

$$\text{bit}=\text{code}[\text{INT}(i/M)\times W+\text{INT}(j/N)]$$

<Step S506>

The quantization condition control unit 302 determines whether the bit value bit acquired in step S505 is "1" or "0". If it is determined that the bit value bit acquired in step S505 is "1", the process advances to step S508; otherwise, the process advances to step S507.

<Step S507>

The quantization condition control unit 302 sets quantization condition A as a quantization condition. Quantization condition A will be described later.

<Step S508>

The quantization condition control unit 302 sets quantization condition B as a quantization condition. Quantization condition B will be described later.

<Step S509>

In step S504, S507, or S508, based on the quantization condition set for the pixel at the pixel position (i, j) in the print image, the error diffusion unit 300 performs, for the pixel, error diffusion processing (quantization processing) described with reference to FIG. 4.

<Step S510>

The CPU 311 increments the value of the variable j by one.

<Step S511>

The CPU 311 determines whether j<WIDTH. If it is determined that j<WIDTH, the process returns to step S503; otherwise, the process advances to step S512.

<Step S512>

The CPU 311 increments the value of the variable i by one.

<Step S513>

The CPU 311 determines whether i<HEIGHT. If it is determined that i<HEIGHT, the process returns to step S502; otherwise, the processing according to the flowchart of FIG. 5 ends.

Quantization conditions A, B, and C will be described next.

The quantization condition in the error diffusion method includes various factors. This embodiment assumes that the quantization condition includes a quantization threshold. Since quantization condition C is used outside the multiplexing region, an arbitrary value may be set as the quantization threshold. For example, if the print image is an 8-bit image and the quantization level is binary, the maximum quantization representative value is "255" and the minimum quantization representative value is "0", as described above. Thus, an intermediate value "128" between these values is set as the quantization threshold. That is, a condition that the quantization threshold is fixed to "128" is adopted as quantization condition C.

Since quantization conditions A and B are used in the multiplexing region, the image quality needs to be different depending on the quantization condition. Note that the difference in image quality needs to be represented so as to be difficult to visually discriminate and needs to be readily discriminate on a printing medium.

Figure 7A:
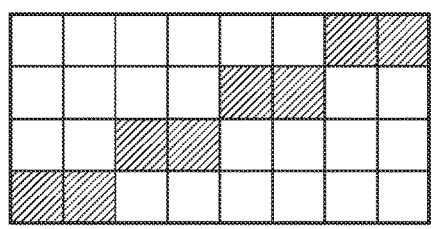
FIGS. 7A and 7B are views each showing an example of a quantization threshold matrix.
Figure 7B:
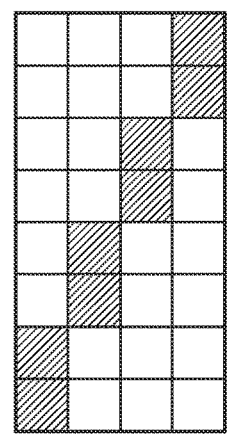

To achieve this, in this embodiment, as an example, a quantization threshold matrix shown in FIG. 7A is adopted as quantization condition A and a quantization threshold matrix shown in FIG. 7B is adopted as quantization condition B. Each square in each quantization threshold matrix corresponds to one pixel. A quantization threshold θ1 is set in each hatched square, and a quantization threshold θ2 (θ2>θ1) is set in each non-hatched square. That is, the quantization threshold matrix shown in FIG. 7A represents the period of a change of the quantization threshold in quantization condition A. The quantization threshold matrix shown in FIG. 7B represents the period of a change of the quantization threshold in quantization condition B.

An excessive value, as compared with the quantization threshold θ2, is used as the quantization threshold θ1. If, for example, the print image is an 8-bit image, the maximum quantization representative value is "255" and the minimum quantization representative value is "0", as described above. Thus, the intermediate value "128" between these values is set as the quantization threshold θ2, and the excessive value "10", as compared with the value "128", is set as the quantization threshold θ1.

If such quantization threshold matrix is used in step S509, the quantization threshold corresponding to the pixel position (i, j) is specified, as follows. That is, if the quantization threshold matrix set for the block to which the pixel position (i, j) belongs is repeatedly, two-dimensionally arranged within the block, the element (quantization threshold) of the quantization threshold matrix corresponding to the pixel position (i, j) is specified. Consequently, the above-described error diffusion processing is performed for the pixel position (i, j) using the specified quantization threshold.

When the quantization threshold lowers, the quantized value of a pixel to which the quantization threshold is applied readily becomes "1" (quantization representative value "255"). That is, in a block to which the quantization threshold matrix of FIG. 7A is applied, pixels with the quantized values "1" are arranged in the arrangement of hatched squares in FIG. 7A. Similarly, in a block to which the quantization threshold matrix of FIG. 7B is applied, pixels with the quantized values "1" are arranged in the arrangement of hatched squares in FIG. 7B. In other words, blocks in which dots are generated in the arrangement of the hatched squares in FIG. 7A, and blocks in which dots are generated in the arrangement of the hatched squares in FIG. 7B coexist for every block of N×M pixels.

In the error diffusion method, a small change of the quantization threshold does not greatly influence the image quality. In the ordered dither method, the image quality of a halftoning expression greatly depends on a dither pattern to be used. However, as described above, the error diffusion method that regularly changes the quantization threshold, the halftoning expression that determines the image quality is only error diffusion. Thus, even if a small change occurs, for example, the arrangement of dots slightly changes or the generation of a texture changes, this hardly influences the image quality of the halftoning expression. Even if the quantization threshold changes, an error which is the difference between an image signal value and a quantized value is diffused to peripheral pixels, and thus the input image signal value is saved macroscopically. That is, when the error diffusion method is used, redundancy is very large with respect to dot arrangement and texture generation.

In the above description, multiplexing is implemented by superimposing predetermined periodicity representing a code on a quantization threshold in the error diffusion method. The present invention, however, is not limited to this. For example, the following methods are also conceivable:
- a method of directly superimposing periodicity on luminance information of R, G, and B;
- a method of dividing luminance information of R, G, and B into luminance-color difference information (for example, Y, Cr, and Cb signals, X, Y, and Z signals, or L*, a*, and b* signals), and multiplexing periodicity; and
- a method of dividing luminance information of R, G, and B into ink colors (for example, C, M, Y, and K signals), and multiplexing periodicity.

The additional information demultiplexing apparatus for extracting (demultiplexing) additional information from a printed product created by printing the print image in which the respective elements of the array CODE have been multiplexed by the additional information multiplexing apparatus 102, as described above, will be described next. An example of an apparatus incorporating such additional information demultiplexing apparatus is a camera-equipped mobile terminal such as a camera-equipped mobile phone, camera-equipped smartphone, or camera-equipped tablet PC. The additional information demultiplexing apparatus may be an apparatus which acquires a captured image of the above-described printed product captured by an external image capturing device, and extracts additional information from the acquired captured image. A camera-equipped mobile terminal incorporating such additional information demultiplexing apparatus will be described. An example of the arrangement of the camera-equipped mobile terminal will be described first with reference to a block diagram shown in FIG. 1B.

A shooting condition setting unit 108 controls the focus setting of an image capturing unit 105.

The image capturing unit 105 captures an object in an image capturing direction in accordance with the orientation of the camera-equipped mobile terminal 104 by performing focusing in accordance with the focus setting controlled by the shooting condition setting unit 108. When the user grips the camera-equipped mobile terminal 104 by his/her hands, adjusts the orientation of the camera-equipped mobile terminal 104 so that the printed product is included in the visual field of the image capturing unit 105, and inputs an image capturing instruction, the image capturing unit 105 captures an image including the printed product. This printed product is created by printing the print image in which the respective elements of the array CODE have been multiplexed by the additional information multiplexing apparatus 102, as described above. This printed product is obtained by the printer 103.

An additional information demultiplexing apparatus 106 extracts the additional information from the image of the printed product captured by the image capturing unit 105, and sends the extracted additional information to a loudspeaker 109 or a display 110 via a terminal 107. If the additional information is voice information, it is sent to the loudspeaker 109 via the terminal 107. Alternatively, if the additional information is image information (including character information), it is sent to the display 110 via the terminal 107. The additional information may be transmitted to an external device via the terminal 107. That is, the output destination of the additional information is not limited to a specific one.

A second image capturing sensor 111 is an image capturing sensor provided separately from the image capturing unit 105. The printed product may be shot using the second image capturing sensor 111.

Figure 8:
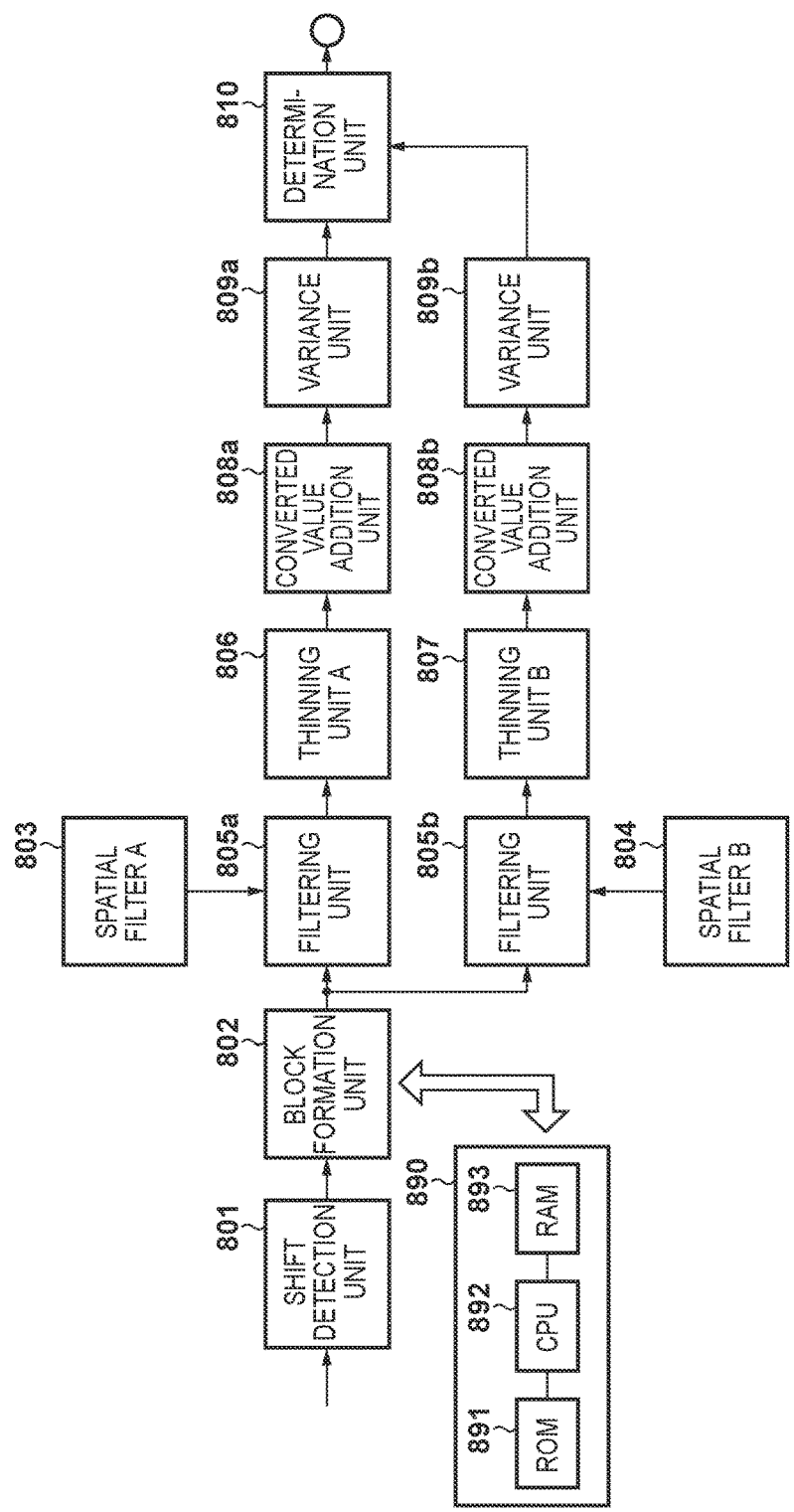
FIG. 8 is a block diagram showing an example of the arrangement of an additional information demultiplexing device.

Next, an example of the arrangement of the additional information demultiplexing apparatus 106 will be described with reference to a block diagram shown in FIG. 8.

A shift detection unit 801 receives the captured image of the printed product sent from the image capturing unit 105. The resolution (image capturing sensor resolution) of the image capturing unit 105 is preferably equal to or higher than that (printer resolution) of the printer 103 for creating a printed product. To accurately read scattering information of dots on a printed product, the image capturing sensor resolution needs to be at least twice higher than the printer resolution in accordance with the sampling theorem, as a matter of course. However, if the image capturing sensor resolution is equal to or higher than the printer resolution, scattering of dots can be determined to some extent though it may be inaccurate. This embodiment assumes that the printer resolution and the image capturing sensor resolution are equal for the sake of simplicity.

The shift detection unit 801 detects a geometric shift of the captured image sent from the image capturing unit 105. The captured image input to the shift detection unit 801 sometimes geometrically, greatly shifts from the print image generated by the additional information multiplexing apparatus 102 because the captured image is input after output by the printer and shooting by the camera-equipped mobile terminal 104. Hence, the shift detection unit 801 detects the boundary (printed product boundary) between the printed product and a region other than the printed product by edge detection.

FIG. 9 shows an example of the captured image of the printed product. If the printer resolution and the image capturing sensor resolution are equal, a large factor to be corrected is the rotation direction (tilt) of an image caused by, for example, a skew that is generated at the time of printing on the printing medium by the printer 103, and a shift generated when the camera-equipped mobile terminal 104 is held over the printed product. By detecting the printed product boundary, the degree of shift occurring in the rotation direction can be determined.

A block formation unit 802 sets rectangular regions (blocks) smaller than the block size by the block formation unit 301 in a plurality of portions on the captured image at given intervals (for every skipped pixel count) (block formation). In the case of FIG. 6, since the block size by the block formation unit 301 is N×M pixels, the size of P×Q pixels of the blocks set, by the block formation unit 802, in the plurality of portions on the captured image at given intervals needs to satisfy conditions that "P≤N" and "Q≤M".

More specifically, block formation is performed so that one block of P×Q pixels is included in a region assumed to be a block of N×M pixels at the time of multiplexing. The "skipped pixel count" is based on "N pixels in the horizontal direction and M pixels in the vertical direction". However, it is necessary to divide, by the block count, the shift amount detected by the shift detection unit 801, calculate a shift amount per block, and add the shift amount to the skipped pixel count, thereby performing correction.

A spatial filter A 803 has coefficients which are created adaptively to the period of the quantization threshold θ1 of quantization condition A. If quantization condition A is based on the quantization threshold matrix shown in FIG. 7A, the spatial filter A 803 is a matrix including respective coefficients shown in FIG. 10A. Assume that a coefficient with a value of "0" is set in each blank square.

A spatial filter B 804 has coefficients which are created adaptively to the period of the quantization threshold θ2 of quantization condition B. If quantization condition B is based on the quantization threshold matrix shown in FIG. 7B, the spatial filter B 804 is a matrix including respective coefficients shown in FIG. 10B. Assume that a coefficient with a value of "0" is set in each blank square.

In either of the spatial filter A 803 and the spatial filter B 804, each square corresponds to one pixel, a coefficient in the central square of 5×5 pixels is applied to a pixel of interest, and coefficients in the 24 peripheral squares are applied to the peripheral 24 pixels of the pixel of interest. As is apparent from FIGS. 10A and 10B, these spatial filters are edge enhancement filters. In addition, the directionality of an edge to be enhanced and the directionality of the quantization threshold θ1 upon multiplexing match each other. That is, the spatial filter shown in FIG. 10A is created so as to match the quantization threshold matrix shown in FIG. 7A, and the spatial filter shown in FIG. 10B is created so as to match the quantization threshold matrix in FIG. 7B.

A filtering unit 805a applies the spatial filter A 803 to the respective pixels of each block formed by the block formation unit 802 to enhance an edge in the block, thereby additionally generating a block different from the block. For example, if the spatial filter A 803 is applied to a pixel of interest, the pixel value of the pixel of interest is multiplied by the coefficient value "2" described in the central square of the spatial filter A 803, and the pixel values of the peripheral pixels of the pixel of interest are respectively multiplied by the coefficient values described in the squares at the corresponding positions in the spatial filter A 803. This allows the pixel values of respective pixels within a region having a size of 5×5 pixels centering the pixel of interest to be respectively multiplied by the coefficient values at corresponding positions in the spatial filter A 803. The sum of the pixel values respectively multiplied by the coefficient values of the 5×5 pixels is obtained, and set as the pixel value of the pixel of interest. By performing the above processing by setting each pixel within the block as a pixel of interest, an edge within the block is enhanced, thereby additionally generating a block different from the block.

A filtering unit 805b applies the spatial filter B 804 to the respective pixels of each block formed by the block formation unit 802 to enhance an edge in the block, thereby additionally generating a block different from the block. The spatial filter B 804 is applied to the block in the same manner as that for application of the spatial filter A 803 to the block.

A thinning unit A 806 performs, based on given regularity, thinning processing for the block (the pixel values of the respective pixels within the block may be referred to as converted values hereinafter) generated by the filtering unit 805a. A thinning unit B 807 performs, based on given regularity, thinning processing for the block (the pixel values of the respective pixels within the block may be referred to as converted values hereinafter) generated by the filtering unit 805b. In this embodiment, the thinning regularity is divided into periodicity and a phase to perform processing. More specifically, the thinning unit A 806 and the thinning unit B 807 are difficult in thinning regularity, and execute a plurality of thinning processes in which the phase is changed. The thinning method will be described later.

A converted value addition unit 808a adds, for each phase, the pixel values (converted values) of the respective pixels within the block after the thinning processing by the thinning unit A 806. A converted value addition unit 808b adds, for each phase, the pixel values (converted values) of the respective pixels within the block after the thinning processing by the thinning unit B 807. The thinning processing and the converted value addition processing are equivalent to extracting power of a predetermined frequency vector enhanced by the spatial filter.

A variance unit 809a calculates the variance of the addition results obtained by the converted value addition unit 808a for the respective phases. A variance unit 809b calculates the variance of the addition results obtained by the converted value addition unit 808b for the respective phases.

A determination unit 810 determines a multiplexed code based on the variances in the respective periodicities obtained by the variance units 809a and 809b.

Figure 11:
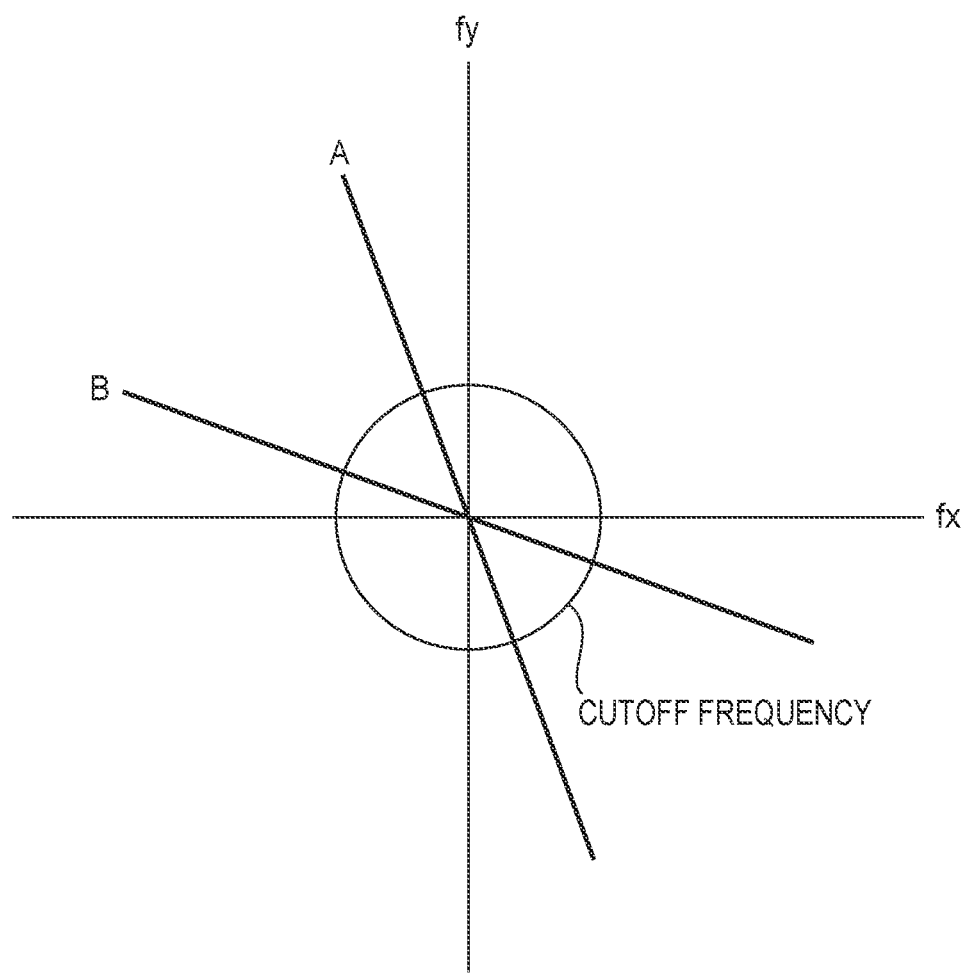
FIG. 11 is a view showing a two-dimensional frequency domain.

In a two-dimensional frequency domain shown in FIG. 11, the abscissa represents the frequency in the horizontal direction, and the ordinate represents the frequency in the vertical direction. The origin at the center indicates a DC component, and the frequency increases as it moves away from the origin. A circle in FIG. 11 indicates a cutoff frequency by error diffusion. The filter characteristic of the error diffusion method indicates the characteristic of an HPF (High Pass Filter) in which a low-frequency range is cut off. The frequency to be cut off changes in accordance with the density of a target image.

In this embodiment, by changing the quantization threshold, a frequency characteristic generated after quantization changes. More specifically, a large power spectrum is generated on straight line A (frequency vector A) shown in FIG. 11 by changing the quantization threshold in the quantization threshold matrix shown in FIG. 7A, and on straight line B (frequency vector B) shown in FIG. 11 by changing the quantization threshold in the quantization threshold matrix shown in FIG. 7B. When demultiplexing additional information, detection of a frequency vector on which a large power spectrum is generated leads to determination of a multiplexed signal. It is, therefore, necessary to individually enhance and extract frequency vectors.

The matrices shown in FIGS. 10A and 10B are equivalent to HPFs each having the directionality of a specific frequency vector. More specifically, the spatial filter shown in FIG. 10A can enhance the frequency vector on straight line A, and the spatial filter shown in FIG. 10B can enhance the frequency vector on straight line B. For example, assume that a large power spectrum is generated on the frequency vector on straight line A shown in FIG. 11 by changing the quantization condition based on the quantization threshold matrix shown in FIG. 7A. In this case, the change amount of the power spectrum is amplified by the spatial filter in FIG. 10A, but is hardly amplified by the spatial filter in FIG. 10B. That is, when a plurality of spatial filters perform filtering in parallel, the power spectrum is amplified only by a spatial filter coincident with the frequency vector, and is hardly amplified by other filters. Thus, a frequency vector on which a large power spectrum is generated can be easily known.

A control unit 890 controls the operations of the respective functional units forming the additional information demultiplexing apparatus 106, and executes or controls respective processes to be described later as processes performed by the additional information demultiplexing apparatus 106. The control unit 890 includes a ROM 891, a CPU 892, and a RAM 893.

The CPU 892 executes processing using computer programs and data stored in the ROM 891 and the RAM 893. Thus, the CPU 892 controls the operations of the respective units of the additional information demultiplexing apparatus 106, and executes or controls the respective processes to be described later as processes performed by the additional information demultiplexing apparatus 106.

The ROM 891 stores setting data of the additional information demultiplexing apparatus 106, and computer programs and data for causing the CPU 892 to execute or control the respective processes to be described later as processes performed by the additional information demultiplexing apparatus 106.

The RAM 893 includes a work area to be used by the CPU 892 to execute various processes.

Figure 12:
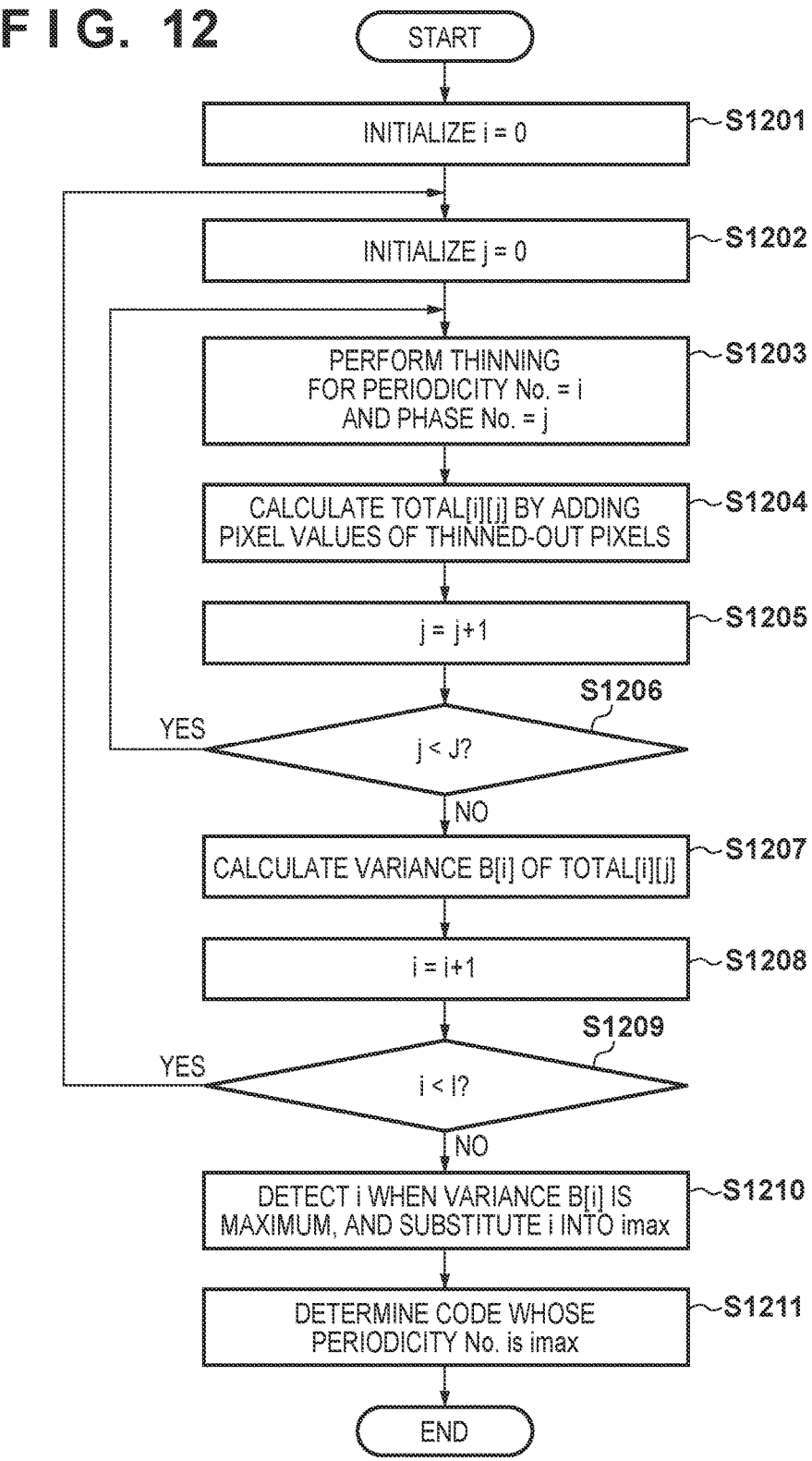
FIG. 12 is a flowchart illustrating code extraction processing.

Processing performed by the thinning unit A 806, thinning unit B 807, converted value addition units 808*a* and 808*b*, variance units 809*a* and 809*b*, determination unit 810, and control unit 890 will be described with reference to FIG. 12 which shows the flowchart of the processing. Note that each block of the processing according to the flowchart of FIG. 12 is performed.

<Step S1201>
The CPU 892 initializes, to 0, the value of the variable i to be used in the subsequent processing.

<Step S1202>
The CPU 892 initializes, to 0, the value of the variable j to be used in the subsequent processing.

<Step S1203>
The CPU 892 determines factors of the thinning regularity for the block generated by the filtering unit 805*a* (filtering unit 805*b*), that is, two factors "periodicity" and "phase". In the subsequent processing, the variable i is used as a variable regarding the periodicity, and the variable j is used as a variable regarding the phase. The conditions of the periodicity and phase are managed by numbers. The factors of a thinning method in which a periodicity number (to be abbreviated as No. hereinafter) is i, and a phase No. is j are set.

<Case in which Value of Variable i is "0">
The thinning unit A 806 performs thinning processing for the block from the filtering unit 805*a* by a thinning method based on the factors of the thinning method in which the periodicity No. is i and the phase No. is j.

<Case in which Value of Variable i is "1">
The thinning unit B 807 performs thinning processing for the block from the filtering unit 805*b* by a thinning method based on the factors of the thinning method in which the periodicity No. is i and the phase No. is j.

<Step S1204>
<Case in which Value of Variable i is "0">
The converted value addition unit 808*a* obtains the sum of the pixel values of the respective pixels in the block having undergone the thinning processing by the thinning unit A 806, and registers the obtained sum in an array TOTAL[i][j].

<Case in which Value of Variable i is "1">
The converted value addition unit 808*b* obtains the sum of the pixel values of the respective pixels in the block having undergone the thinning processing by the thinning unit B 807, and registers the obtained sum in an array TOTAL[i][j].

<Step S1205>
The CPU 892 increments the value of the variable j by one.

<Step S1206>
The CPU 892 determines whether the value of the variable j is smaller than "a number J of times to perform thinning processing while changing the phase". If j<J is determined, the process returns to step S1203; otherwise, the process advances to step S1207.

<Step S1207>
<Case in which Value of Variable i is "0">
The variance unit 809*a* obtains the variance of the array TOTAL[i][j]. That is, the degree of variation of the respective sums registered in the array TOTAL[i][j] depending on the phase difference is evaluated. The variance unit 809*a* then registers the obtained variance in an array B[i].

<Case in which Value of Variable i is "1">
The variance unit 809*b* obtains the variance of the array TOTAL[i][j], and registers the obtained variance in the array B[i].

<Step S1208>
The CPU 892 increments the value of the variable i by one.

<Step S1209>
The CPU 892 determines whether the value of the variable i is smaller than "a number I of times to perform thinning processing while changing the periodicity" (I=2 in this embodiment). If i<I is determined, the process returns to step S1202; otherwise, the process advances to step S1210.

<Step S1210>
The determination unit 810 specifies a maximum value B[i'] of B[0] to B[I−1], and substitutes i' into a variable imax.

<Step S1211>
The determination unit 810 determines, as a multiplexed code, a code whose periodicity No. is imax.

To describe the processing according to the flowchart of FIG. 12 using a practical example, an example of I=2 and J=4 will be explained. FIGS. 13 and 14 show thinning methods in a table format when the block size is defined by P=Q=16, and show a thinning method (corresponding to the thinning unit A 806) for the periodicity No.=0 and a thinning method (corresponding to the thinning unit B 807) for the periodicity No.=1, respectively. In either of FIGS. 13 and 14, each square represents one pixel. Note that P=Q is set in FIGS. 13 and 14. However, P≠Q may be set and the blocks need not be rectangular.

A value described in each square indicates the phase No. when a pixel corresponding to the square is thinned out. For example, a pixel corresponding to a square in which "0" is described is a pixel to be thinned out when j=0. That is, there are four types of phases in both FIGS. 13 and 14 which correspond to thinning methods when the phase No. j is 0 to 3.

The periodicities in FIGS. 13 and 14 match those in FIGS. 7A and 7B, respectively. As described above, in both FIGS. 7A and 7B, pixels with quantized values "1" are arranged in the arrangement of hatched squares. For example, in a block for which quantization condition A is set at the time of multiplexing, quantized values "1" are easily arranged at the periodicity shown in FIG. 7A. Consequently, if a matched spatial filter is used to perform filtering, the frequency component is further amplified. If thinning is executed at the periodicity shown in FIG. 13 to obtain the above-described sum, the variance of the sum becomes large. However, if filtering using an unmatched spatial filter is performed for a block for which quantization condition A is set at the time of multiplexing, and thinning is executed at the periodicity shown in FIG. 14, the variance of the sum becomes small. That is, since the periodicity of the quantized values and the periodicity of thinning are different, the sums depending on the difference of the phase of thinning become average, and the variance becomes small. To the contrary, in a block in which quantization condition B is set at the time of multiplexing, the variance becomes small when thinning is executed at the periodicity shown in FIG. 13, and becomes large when thinning is executed at the periodicity shown in FIG. 14.

Figure 5:
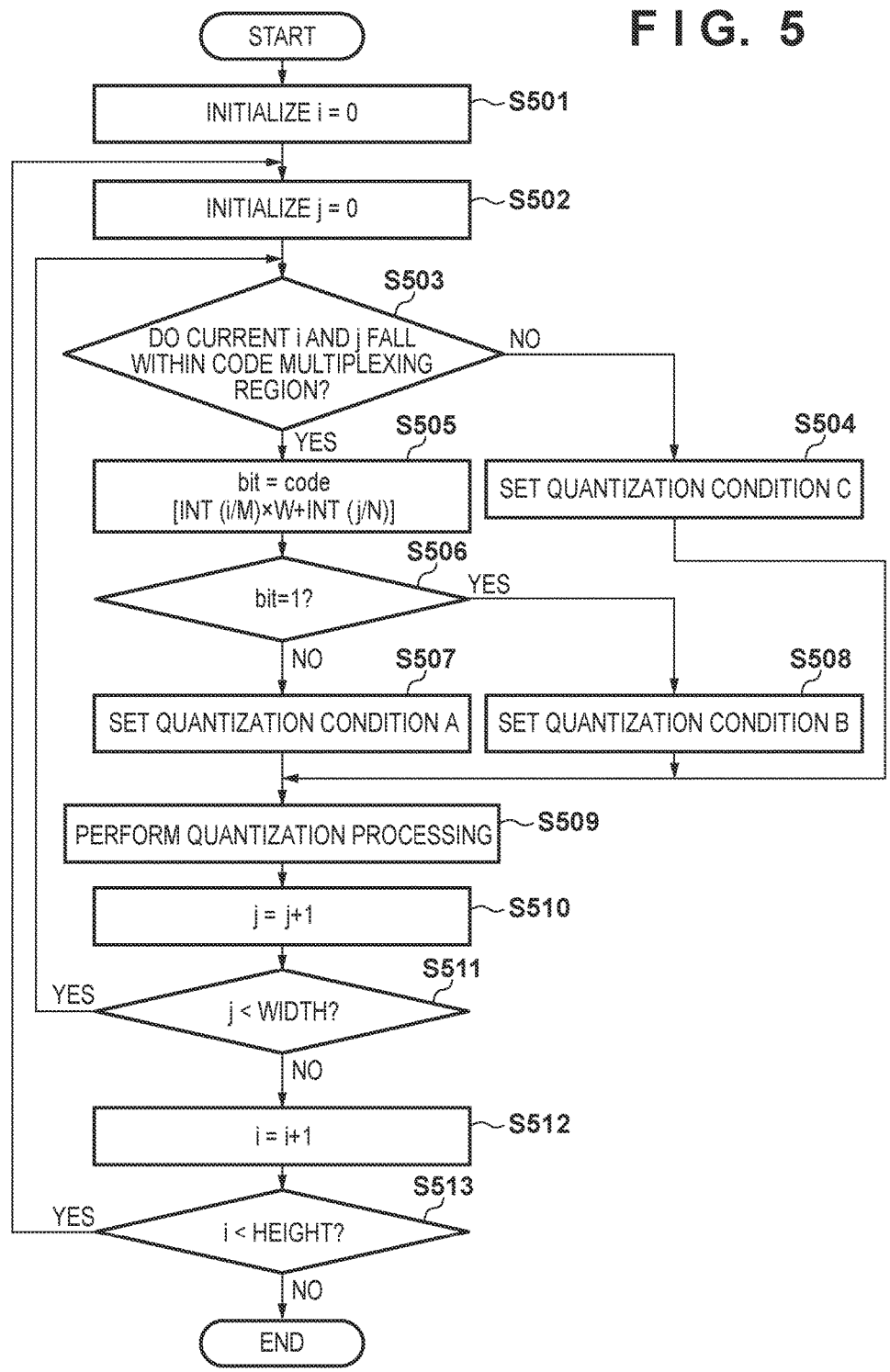
FIG. 5 is a flowchart illustrating processing performed by the additional information multiplexing apparatus.

In application of the above-described example to the flowchart shown in FIG. 5, quantization condition A is set when the bit value bit=0, and quantization condition B is set when the bit value bit=1. Thus, the bit value bit=0 can be determined when the variance of the periodicity No.=0 is large, and the bit value bit=1 can be determined when the variance of the periodicity No.=1 is large. That is, multiplexing and demultiplexing can be readily implemented by associating the quantization condition, the spatial filter characteristic, and the periodicity of the thinning condition. Note that in the above description, two types of periodicity Nos. "0" and "1" are used, and a multiplexed code in a block has one bit. However, three or more types of periodicity Nos. may be used and a multiplexed code may have two or more bits. The type of the quantization condition, the type of the spatial filter, and the type (value I) of the periodicity No. of the thinning condition match each other, as a matter of course.

In this embodiment, the code can be readily demultiplexed without comparing the power value of a frequency corresponding to the regularity of the quantization condition by orthogonal transformation. In addition, since the processing is performed in the real space domain, demultiplexing processing can be implemented at very high speed.

Note that quantization conditions A and B, spatial filters A and B, the thinning unit A 806, and the thinning unit B 807 are merely examples, and the present invention is not limited to them. That is, another periodicity may be given, and the number of taps of the spatial filter, the thinning block size, and the like may be larger or smaller than in the above-mentioned example.

The operation procedure shown in FIG. 12 has been explained as repetitive processing of the variable i corresponding to the periodicity No. and the variable j corresponding to the phase No. for the sake of simplicity. In practice, however, repetitive processing using a pixel address in a block of P×Q pixels is readily implemented. More specifically, as shown in FIGS. 13 and 14, two kinds of information, that is, the periodicity No. and the phase No. are stored in advance as a table for each pixel address in a block, and the pixel values are added to the respective variables of the corresponding periodicity No. and phase No. In this method, the sums of the sets of the periodicity Nos. and phase Nos. can be calculated in parallel by only processing P×Q pixels.

Furthermore, in the operation procedure shown in FIG. 12, the variances of the sums of thinned-out pixel values after filtering using the spatial filters are calculated, and the code is determined by comparing the magnitudes of the variances. However, the present invention is not limited to this. For example, a method of comparing evaluation functions without using variances is also usable. That is, the deviation of the sums of thinned-out pixel values suffices to evaluate the "degree of variation" because a value tends to be noticeable for only one phase when the phase is shifted. For example, to evaluate the degree of variation, the following evaluation functions in addition to the variances are conceivable:

(1) the difference between the maximum and minimum values among the sums of thinned-out pixel values;

(2) either of the difference between the maximum value and the second maximum value among the sums of thinned-out pixel values, and the difference between the minimum value and the second minimum value; and (3) the maximum value of the differences between consecutive values in a histogram created by the sums of thinned-out pixel values.

Although the evaluation functions of (1), (2), and (3) represent absolute difference values, the relative ratio between the difference value and the pixel value or the sums of pixel values or converted values can also be used as an evaluation function. The quantized value is binary in the example, but is not limited to this. In this embodiment, information after quantization is transmitted to the printer 103. However, the printer 103 may execute the above-described multiplexing processing and quantization processing. That is, some or all of the processes described as the processes performed by the additional information demultiplexing apparatus 106 may be performed by the printer 103.

As described above, according to this embodiment, the quantization condition is changed for each block formed from M×N pixels in an image, and the image is quantized in accordance with the quantization condition, thereby making it possible to embed predetermined information in the image. Consequently, as compared with, for example, a method of embedding information by orthogonal transformation, information can be embedded in an image so that degradation in image quality can be suppressed and the embedded information can be accurately extracted at high speed.

Consider processing of multiplexing "additional information as voice information of several sec" in a print image (image information) using the above-described additional information multiplexing method. Even if voice information of several sec is encoded by an encoding method with a high compression ratio, which is specialized in voice, the information amount is several to ten-odd Kbytes. When multiplexing information of such large information amount on an image, it is insufficient to multiplex the information in only a partial region of the image, and it is necessary to multiplex pieces of information obtained by dividing the information in a plurality of portions on the image, respectively.

Consider a printed product obtained by multiplexing pieces of additional information obtained by dividing such additional information in a plurality of portions on a print image, respectively, and then printing the print image using the printer 103. As an example, assume that the pieces of additional information are respectively multiplexed in the central portion and four corners of a printed product (the central portion and four corners of a print image).

To extract additional information from such printed product, it is necessary to acquire a captured image of the printed product by capturing the printed product using the camera-equipped mobile terminal 104. To do this, the user sets the camera-equipped mobile terminal 104 in a "close-up mode or very short range mode wherein the distance from the printed product is set short", sets the camera-equipped mobile terminal 104 to be focused on the central portion of the imaging field of the image capturing unit 105, and then captures the printed product at a distance such that the entire printed product can be captured at once. However, since the distance between the image capturing unit 105 and the printed product is short, if the central portion is in focus, the edge portion of the printed product is out of focus due to a field curvature aberration. As a result, the edge portion of the printed product in the captured image blurs. It is difficult to extract "the additional information multiplexed in each of the four corners of the printed product (the four corners of the print image)" from the captured image in which the edge portion of the printed product blurs. To cope with this, after acquiring a captured image whose central portion is in focus, an image is captured by causing the mobile terminal to be focused on each of the four corners of the printed product (four captured images are obtained). There are various methods of causing the mobile terminal to be focused on a target portion. For example, the camera-equipped mobile terminal 104 may be made to focus on an arbitrary portion by moving the camera-equipped mobile terminal 104 or by moving the focus position by the setting of the camera-equipped mobile terminal 104 without moving the camera-equipped mobile terminal 104. Since all of the five captured images obtained by five image capturing operations are captured images in each of which one of the portions where the additional information has been multiplexed is in focus (the image quality of one of the portions where the additional information has been multiplexed is good), it is possible to satisfactorily extract the additional information from each captured image. By integrating the extracted pieces of additional information, the additional information multiplexed in the overall printed product can be obtained.

Figure 15A:
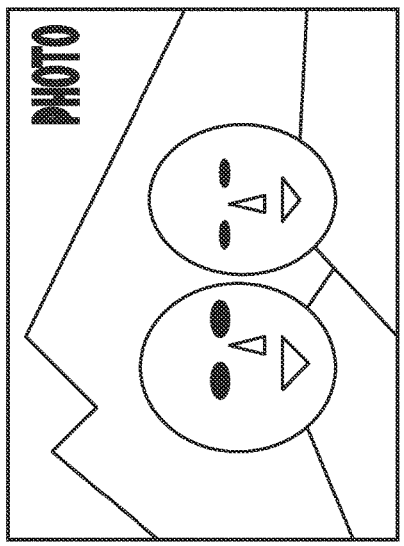
FIGS. 15A to 15D are views each showing a print image or a print image in which an artificial image is multiplexed.

A printed product from which such additional information can be extracted must be a printed product such that "a portion where additional information has been multiplexed can be in focus". Assume, for example, that a print image printed on a printed product is an image including two persons 1501 and 1502 in front against the background of a distant view 1503 of mountains, as shown in FIG. 15A. In general, in this image, the two persons 1501 and 1502 are in focus and the distant view 1503 is out of focus. Thus, the image shown in FIG. 15A is an image in which the central portion is in focus and the peripheral portion is out of focus. If pieces of additional information are respectively multiplexed in the central portion and four corners of the image, the additional information multiplexed in the central portion can be satisfactorily extracted since the central portion is in focus. However, the four corners are out of focus and blur, and there is no edge with a sufficient edge amount. Even if, for example, contrast AF (Auto Focus) is used to cause the mobile terminal to be focused on a region where there is no edge with a sufficient edge amount in order to capture the region, no satisfactory focusing can be performed.

To cope with this, in this embodiment, if there is a portion (target portion), where an edge amount is insufficient, among the portions of the print image in which the pieces of additional information are respectively multiplexed, image information having a sufficient edge amount is multiplexed in the target portion. There are various kinds of information which can be applied as "image information having a sufficient edge amount". For example, an image or character having a color different from those of other images or characters, or an image/character whose edge line is more noticeable than those of other images/characters. Since this allows the target portion to be in focus, the additional information multiplexed in the target portion can be extracted.

Figure 16:
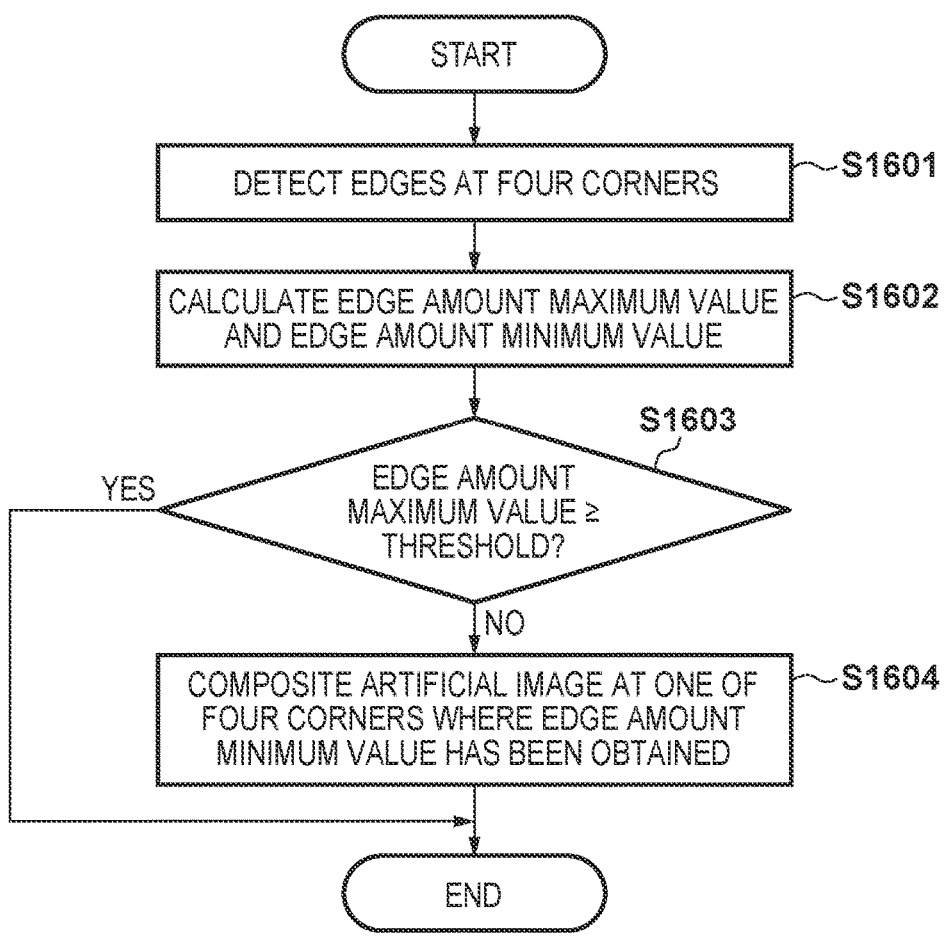
FIG. 16 is a flowchart illustrating processing executed by a composition control unit and a composition unit.

Processing executed by the composition control unit 201 and the composition unit 202 will be described with reference to FIG. 16 which shows the flowchart of the processing. FIG. 16 assumes that the multiplexing unit 200 multiplexes pieces of additional information in regions (for example, as for the four corners, regions at predetermined distances or less from the positions of the corners) at at least four corners of a print image. However, even if pieces of additional information are multiplexed in any portions on the print image, if the multiplexing portions are known, the processing according to the flowchart of FIG. 16 is performed by handling the known portions as the regions at the four corners.

<Step S1601>

The composition control unit 201 performs known edge detection filtering for each of the regions at the four corners of the print image, thereby detecting an edge from each region. For example, the composition control unit 201 detects an edge from each of rectangular regions at the upper left, lower left, upper right, and lower right corners obtained by dividing the print image into a plurality of rectangular regions (rectangular regions having a size larger than that of the regions where the pieces of additional information are multiplexed).

<Step S1602>

The composition control unit 201 obtains, for each of the regions at the four corners of the print image, the amount (edge amount) of the edge within the region. The square root of the sum of the square of a differential value in the x direction and the square of a differential value in the y direction at each of the pixel positions of an edge within a region of interest may be obtained, and the total of the obtained square roots may be calculated, and used as the edge amount of the region of interest. Alternatively, the sum of the absolute value of a differential value in the x direction and the absolute value of a differential value in the y direction at each of the pixel positions of the edge within the region of interest may be obtained, and the total of the obtained sums may be calculated, and used as the edge amount of the region of interest. Note that the definition of the edge amount within the region of interest is not limited to this, and the amount of high-frequency components within the region of interest may be used as an edge amount. Instead of the total (or an average value obtained by dividing the total by the number of pixels within the region), a local edge amount within the region may be set as an evaluation target. For example, an evaluation function of evaluating the contrast amount between adjacent pixels, the edge gradient between adjacent pixels, or the like may be used. The composition control unit 201 specifies a largest edge amount (edge amount maximum value) and a smallest edge amount (edge amount minimum value) from the edge amounts of the regions at the four corners.

<Step S1603>

The composition control unit 201 determines whether the edge amount maximum value is equal to or larger than a threshold. If it is determined that the edge amount maximum value is equal to or larger than the threshold, the processing according to the flowchart of FIG. 16 ends. That is, the composition unit 202 directly sends, to the printer 103, the print image having undergone the multiplexing processing by the multiplexing unit 200. On the other hand, if the edge amount maximum value is smaller than the threshold, the process advances to step S1604.

<Step S1604>

The composition control unit 201 obtains an artificial image to be multiplexed in the region, of the regions at the four corners of the print image, where the edge amount minimum value has been obtained, and outputs it to the composition unit 202. The artificial image may be generated by the composition control unit 201 and then output, or the artificial image generated in advance and stored in the ROM 312 may be read out by the composition control unit 201 and then output. As the artificial image, any image information (information representing a character and/or an image) which sets the edge amount to be equal to or larger than the threshold by composition may be used.

The composition unit 202 multiplexes the artificial image received from the composition control unit 201 in the region where the edge amount minimum value has been obtained. A method of multiplexing the artificial image is not limited to a specific one and, for example, the artificial image may be simply composited in the region. The composition unit 202 outputs, to the printer 103, the print image in which the artificial image has been composited.

Figure 15B:
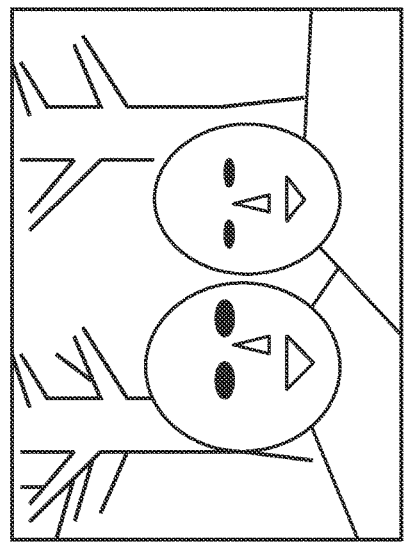

If all the edge amounts of the regions at the upper left, lower left, upper right, and lower right corners in the print image shown in FIG. 15A are smaller than the threshold, and the region where the edge amount minimum value has been obtained is at the upper right corner, an artificial image is multiplexed in the region at the upper right corner, as shown in FIG. 15B. In FIG. 15B, an image of a character string "PHOTO" is multiplexed as an artificial image in the region at the upper right corner of the print image. In the print image shown in FIG. 15A, since there are edges in the regions at the upper left, lower left, and lower right corners but there is no edge in the region at the upper right corner, the edge amount of the region at the upper right corner is specified as an edge amount minimum value. Consequently, as shown in FIG. 15B, the artificial image is multiplexed in the region at the upper right corner.

Figure 15C:
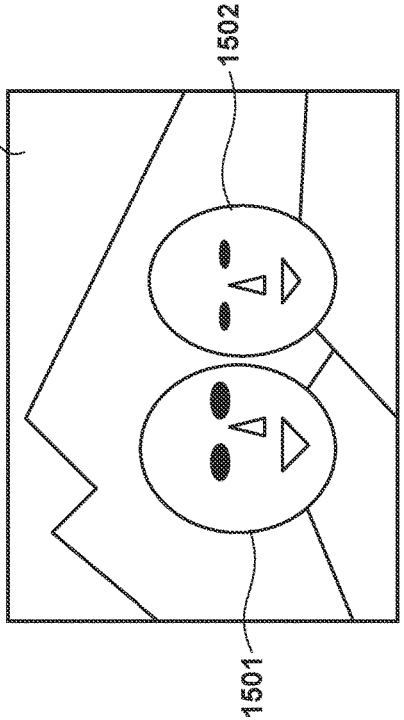

In FIG. 15C, all the edge amounts of the regions at the upper left, lower left, upper right, and lower right corners are smaller than the threshold, and there are edges in the regions at the lower left, upper right, and lower right corners, but there is no edge in the region at the upper left corner. Consequently, as shown in FIG. 15C, the artificial image is multiplexed in the region at the upper left corner.

Figure 15D:
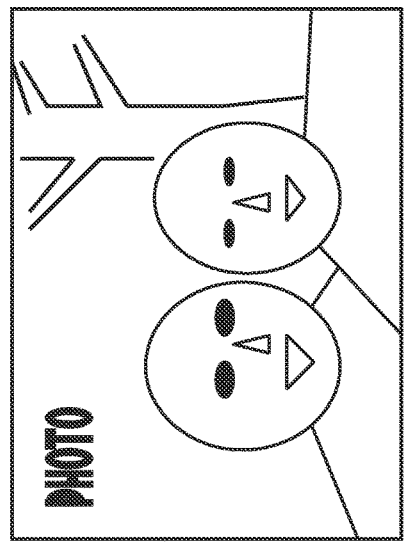

In FIG. 15D, there are edges in all the regions at the upper left, lower left, upper right, and lower right corners, and the edge amount maximum value of the edge amounts of the regions at the upper left, lower left, upper right, and lower right corners is equal to or larger than the threshold. Thus, no artificial image is multiplexed.

In this embodiment, as described above, if an edge amount at at least one corner is large, the parameters of the image capturing unit 105 for performing focusing on the region can be used to focus on the remaining three corners, and thus no artificial image is composited.

Note that it is effective to dynamically change the color of the artificial image of "PHOTO" used in the example of FIGS. 15A to 15D in accordance with the color of the composited region (the region of a background) as a region in which the artificial image is multiplexed. Furthermore, there is an effective method of determining one of the positions of the four corners, at which the color edge occurring when compositing the artificial image of "PHOTO" in the composited region without changing the color of the artificial image becomes largest, and compositing the artificial image at the corner where the color edge is largest. Although the word "PHOTO" is composited as the artificial image in this embodiment, the present invention is not limited to a significant word and a logotype, symbol, or graphic may be used. Image processing may be performed not only to increase an edge amount by compositing the artificial image but also to increase the sharpness of an image.

Second Embodiment

In the first embodiment, whether to multiplex an artificial image is determined based on the edge amounts of regions in a print image, where the pieces of additional information are respectively multiplexed. In this embodiment, whether to multiplex an artificial image is determined based on the type of AF function implemented in an image capturing unit 105.

Figure 17:
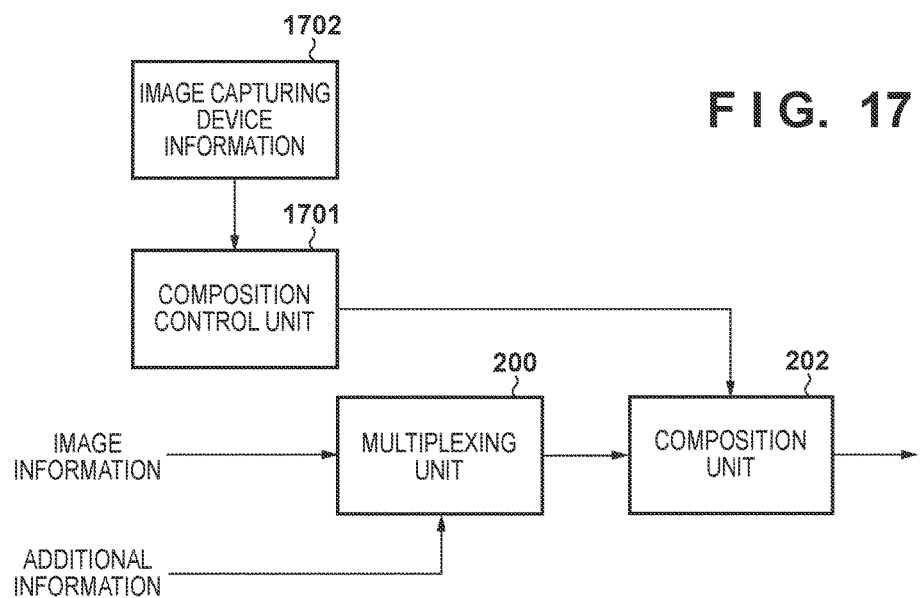
FIG. 17 is a block diagram showing an example of the arrangement of an additional information multiplexing apparatus.

An example of the arrangement of an additional information multiplexing apparatus 102 according to this embodiment will be described with reference to a block diagram shown in FIG. 17. In FIG. 17, the same reference numerals as those in FIG. 2 denote the same functional units and a description thereof will be omitted.

Image capturing device information 1702 represents the type of AF function implemented in the image capturing unit 105. In general, the image capturing device information 1702 represents the type of AF function implemented in an image capturing apparatus assumed as an image capturing apparatus for capturing a printed product by a printer 103.

A composition control unit 1701 specifies the type of AF function implemented in the image capturing unit 105 with reference to the image capturing device information 1702, and determines based on the specified type of AF function whether to output an artificial image to a composition unit 202. More specifically, if the image capturing device information 1702 indicates that "phase difference AF is implemented in the image capturing unit 105", the composition control unit 1701 determines not to multiplex an artificial image, and performs no processing of acquiring an artificial image and outputting it to the composition unit 202. On the other hand, if the image capturing device information 1702 indicates that "contrast AF is implemented in the image capturing unit 105", the composition control unit 1701 determines to multiplex an artificial image, and thus acquires the artificial image and outputs it to the composition unit 202.

As for a position at which the artificial image is multiplexed, the artificial image may be multiplexed in a portion of an edge amount minimum value, similarly to the first embodiment, or the artificial image may be multiplexed in each of all portions where pieces of additional information are respectively multiplexed. This applies to the subsequent embodiments (unless otherwise specified).

Note that instead of determining, based on the type of AF function implemented in the image capturing unit 105, whether to multiplex an artificial image, whether to multiplex an artificial image may be determined in accordance with the lens characteristic of the image capturing unit 105.

Third Embodiment

In the first embodiment, whether to multiplex an artificial image is determined based on the edge amounts of regions in a print image, where the pieces of additional information are respectively multiplexed. In this embodiment, whether to multiplex an artificial image is determined in accordance with whether a printer (a printer 103 in FIG. 1) connected to an additional information multiplexing apparatus 102 has a capability of implementing invisible additional information multiplexing.

Figure 18:
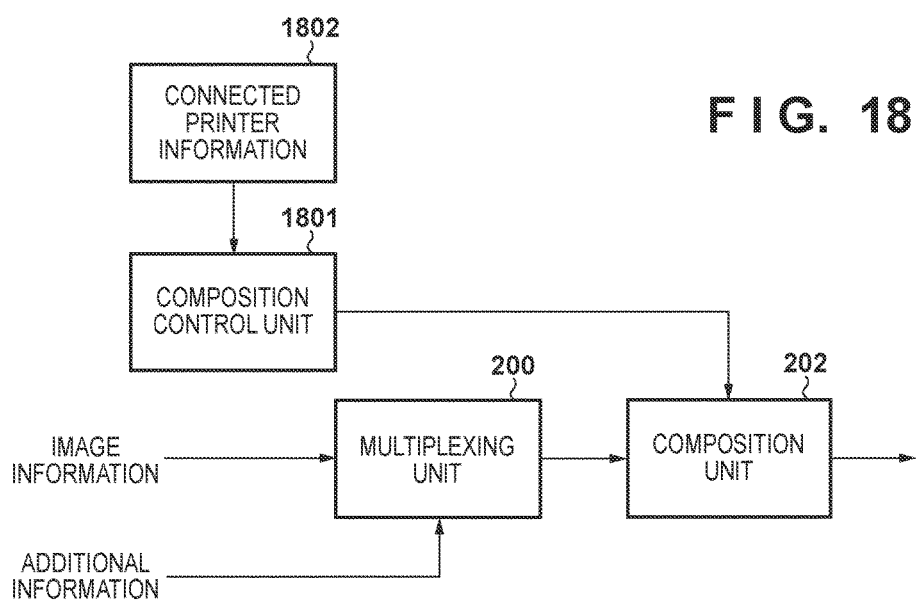
FIG. 18 is a block diagram showing an example of the arrangement of an additional information multiplexing apparatus.

An example of the arrangement of the additional information multiplexing apparatus 102 according to this embodiment will be described with reference to a block diagram shown in FIG. 18. In FIG. 18, the same reference numerals as those in FIG. 2 denote the same functional units and a description thereof will be omitted.

Connected printer information 1802 indicates whether the printer (the printer 103 in FIG. 1) connected to the additional information multiplexing apparatus 102 has a capability of implementing invisible additional information multiplexing.

Figure 19:
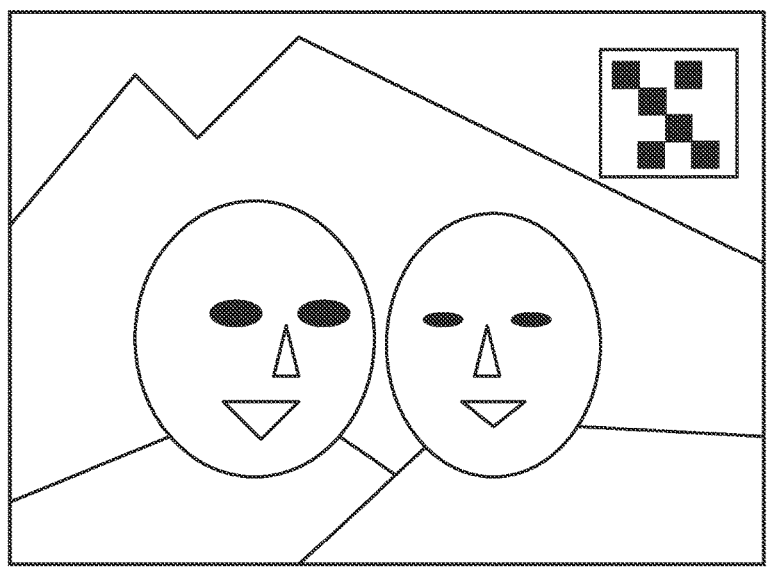
FIG. 19 is a view showing an example of a print image.

With reference to the connected printer information 1802, a composition control unit 1801 specifies whether the printer (the printer 103 in FIG. 1) connected to the additional information multiplexing apparatus 102 has a capability of implementing invisible additional information multiplexing. If the printer (the printer 103 in FIG. 1) connected to the additional information multiplexing apparatus 102 has no capability of implementing invisible additional information multiplexing, the composition control unit 1801 outputs a visible code (for example, a two-dimensional barcode or the like) to a composition unit 202. The composition unit 202 multiplexes the visible code on a print image. FIG. 19 shows an example of the print image in which the visible code has been multiplexed. Referring to FIG. 19, a two-dimensional barcode as a visible code is multiplexed at the upper right corner position of the print image.

On the other hand, if the printer (the printer 103 in FIG. 1) connected to the additional information multiplexing apparatus 102 has a capability of implementing invisible additional information multiplexing, the composition control unit 1801 outputs a visible code and/or an invisible code to the composition unit 202. The composition unit 202 multiplexes the code from the composition control unit 1801 on a print image.

Since a printer having a capability of implementing invisible additional information multiplexing can perform three kinds of information multiplexing, that is, (1) only invisible multiplexing, (2) invisible multiplexing+visible multiplexing, and (3) only visible multiplexing, the composition control unit 1801 instructs the composition unit 202 to perform one of these kinds of information multiplexing. In the case of information multiplexing of (2), it is effective to perform invisible multiplexing of some part of additional information and perform visible multiplexing of the remaining part of the information. In the case of (3), some or all of additional information is multiplexed as a visible code.

In this embodiment as well, as for the position of multiplexing of information by the composition unit 202, information may be multiplexed in a portion of an edge amount minimum value, similarly to the first embodiment, or information may be multiplexed in each of all portions where pieces of additional information are respectively multiplexed.

Fourth Embodiment

In the first embodiment, whether to multiplex an artificial image is determined based on the edge amounts of regions in a print image, where the pieces of additional information are respectively multiplexed. In this embodiment, whether to multiplex an artificial image is determined in accordance with a user instruction.

Figure 20:
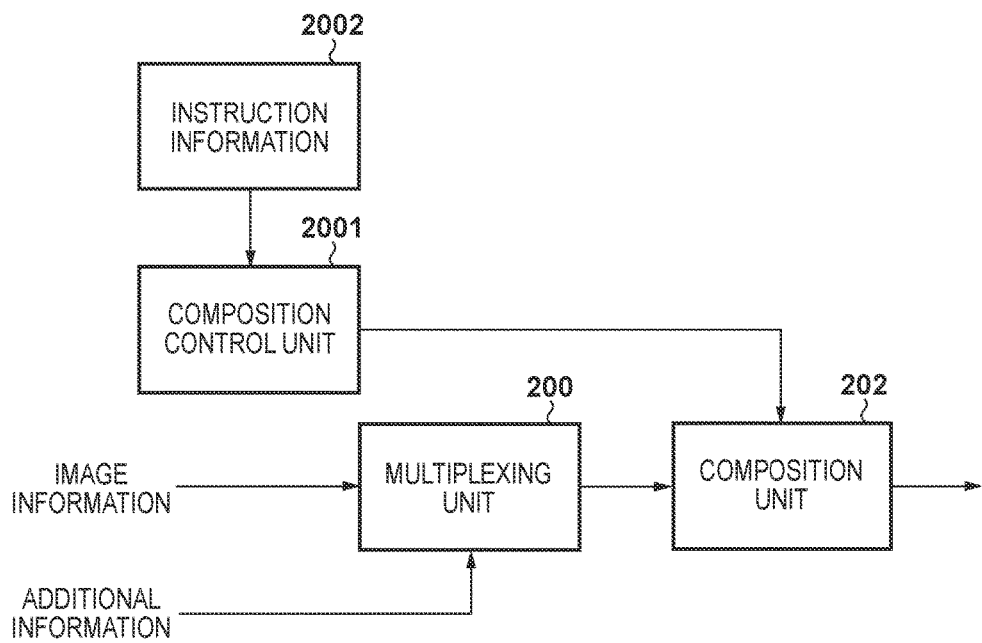
FIG. 20 is a block diagram showing an example of the arrangement of an additional information multiplexing apparatus.

An example of the arrangement of an additional information multiplexing apparatus 102 according to this embodiment will be described with reference to a block diagram shown in FIG. 20. In FIG. 20, the same reference numerals as those in FIG. 2 denote the same functional units and a description thereof will be omitted.

Figure 21:
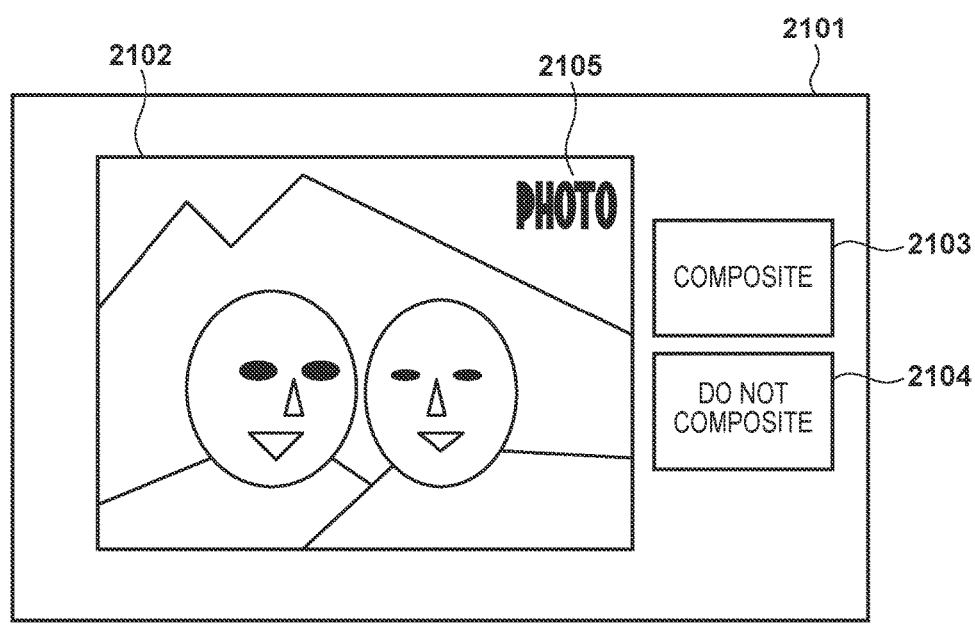
FIG. 21 is a view showing an example of display of a GUI.

When the user inputs an application activation instruction by operating the operation unit (not shown) of the additional information multiplexing apparatus 102, a CPU 311 displays, on a display screen (not shown), a GUI (Graphical User Interface) exemplified in FIG. 21. A print image instructed by the user is displayed in a region 2102 provided in a window 2101 of the GUI. A button 2103 is used to instruct to composite an artificial image on the print image displayed in the region 2102. A button 2104 is used to instruct not to composite an artificial image on the print image displayed in the region 2102. When the user instructs the button 2103 by operating the operation unit (not shown), a composition control unit 2001 acquires an artificial image 2105 and sends it to a composition unit 202. The composition unit 202 multiplexes the artificial image 2105 at an appropriate position on the print image. The multiplexing result is displayed in the region 2102. The multiplexing position of the artificial image 2105 may be a predesignated position, a position instructed by the user using the operation unit (not shown), or a position determined as in the first embodiment. The user may move the artificial image 2105 by operating the operation unit (not shown) after multiplexing. The user may designate or change the color and size of the artificial image 2105 by operating the operation unit (not shown).

When the user inputs a print instruction by operating the operation unit (not shown), a printer 103 prints the print image which has been edited through the GUI (including a case in which no artificial image is multiplexed).

With this instruction of the presence/absence of composition of the artificial image, for example, the user can instruct composition of the artificial image 2105 to explicitly indicate that the printed product is an invisible multiplexing printed product when transferring the printed product to another user. As described above, this embodiment provides an instruction arrangement capable of selecting multiplexing.

Fifth Embodiment

In the first embodiment, whether to multiplex an artificial image is determined based on the edge amounts of regions in a print image, where the pieces of additional information are respectively multiplexed. In this embodiment, whether to multiplex an artificial image is determined in accordance with the information amount of additional information.

Figure 22:
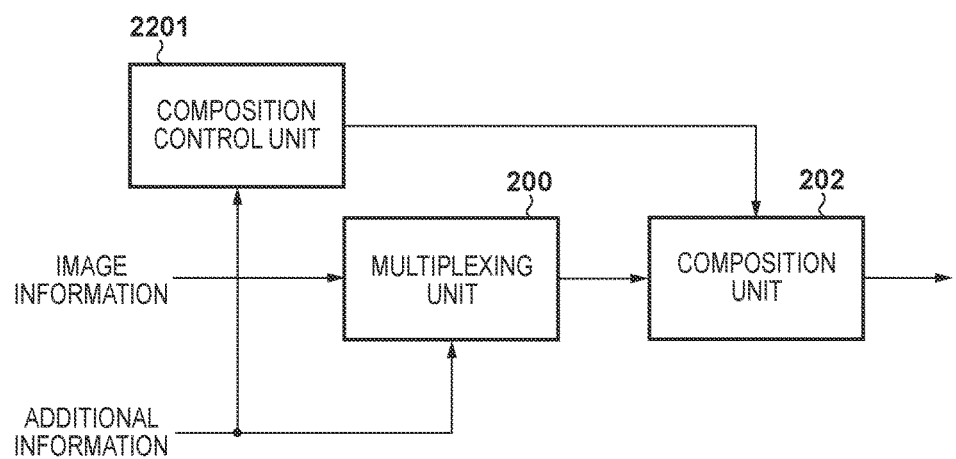
FIG. 22 is a block diagram showing an example of the arrangement of an additional information multiplexing apparatus.

An example of the arrangement of an additional information multiplexing apparatus 102 according to this embodiment will be described with reference to a block diagram shown in FIG. 22. In FIG. 22, the same reference numerals as those in FIG. 2 denote the same functional units and a description thereof will be omitted.

As described in the first embodiment, when multiplexing information of a relatively large information amount on an image, it is insufficient to multiplex the information in only a partial region of the image, and it is necessary to multiplex pieces of information obtained by dividing the information in a plurality of portions on the image, respectively. On the other hand, if the information is character information, date information of shooting of a picture, or shooting location information, the information amount is relatively small. Thus, it is sufficient to multiplex the information in only a partial region of an image (for example, the central portion of a print image), or pieces of information obtained by dividing the information may be multiplexed in a plurality of portions of the image, respectively, as a matter of course. In either case, when "additional information of a relatively small information amount" multiplexed in a print image is extracted, it is not necessary to accurately analyze the entire print image including an edge portion, and it is sufficient to analyze a partial region.

Consequently, in this embodiment, a composition control unit 2201 determines whether the information amount of additional information is equal to or larger than a threshold. If the information amount is equal to or larger than the threshold, the composition control unit 2201 acquires an artificial image and sends it to a composition unit 202; otherwise, the composition control unit 2201 performs no processing of acquiring an artificial image and sending it to the composition unit 202.

Sixth Embodiment

In the first embodiment, whether to multiplex an artificial image is determined based on the edge amounts of regions in a print image, where the pieces of additional information are respectively multiplexed. In this embodiment, whether to multiplex an artificial image is determined in accordance with the print settings (print settings related to a printing medium such as paper) of a printer 103.

Figure 23:
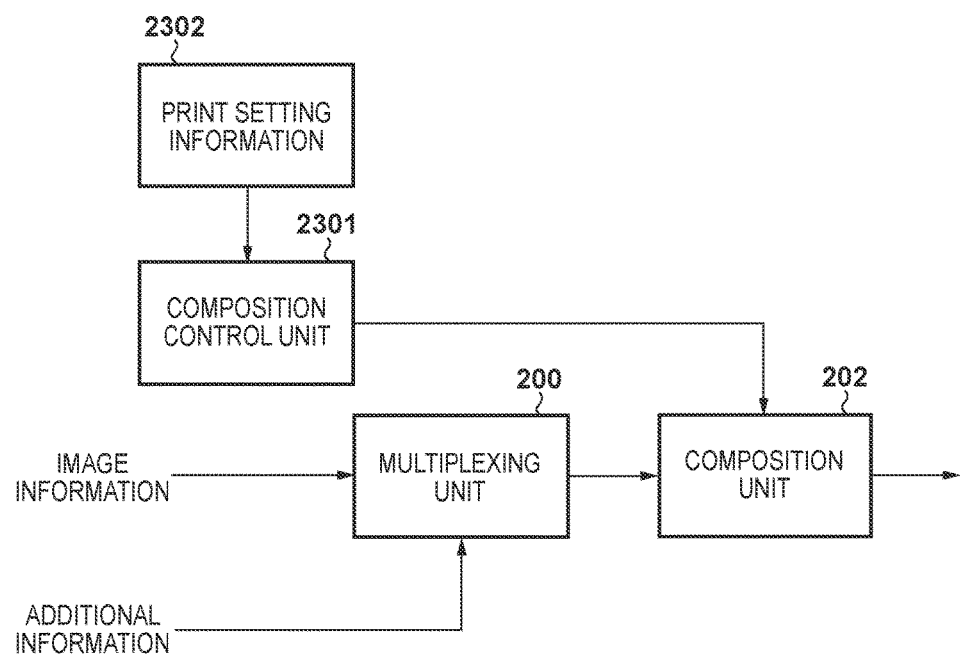
FIG. 23 is a block diagram showing an example of the arrangement of an additional information multiplexing apparatus.

An example of the arrangement of an additional information multiplexing apparatus 102 according to this embodiment will be described with reference to a block diagram shown in FIG. 23. In FIG. 23, the same reference numerals as those in FIG. 2 denote the same functional units and a description thereof will be omitted.

Print setting information 2302 represents the print settings of the printer 103, and includes information related to a printing medium such as the size and type of a printing medium used by the printer 103.

A composition control unit 2301 specifies the size of the printing medium used by the printer 103 with reference to the print setting information 2302. If the size of the printing medium is equal to or larger than a predetermined size (for example, A5 size), the composition control unit 2301 acquires an artificial image and sends it to a composition unit 202; otherwise, the composition control unit 2301 performs no processing of acquiring an artificial image and sending it to the composition unit 202. Note that whether to perform processing of acquiring an artificial image and sending it to the composition unit 202 may be determined in accordance with the type of the printing medium instead of the size of the printing medium.

Note that since so-called borderless printing in which no margin is on the edge of paper is the mainstream in the current photolithography, the composition position of the artificial image is preferably in the same region as that where a natural image has been printed.

When the user is ready to shoot the entire printed product by gripping a camera-equipped mobile terminal 104, the central portion of a lens corresponds to the central portion of the printed product. Therefore, a captured image of a portion farther away from the central portion of the printed product is influenced more by Seidel's aberrations. If the printed product is rectangular, the composition position of the artificial image is preferably one of the four corners away from the central portion.

Seventh Embodiment

The seventh embodiment will be described below.

There are various kinds of additional information to be embedded in an image. When performing multiplexing, effective multiplexing cannot be performed unless preprocessing according to additional information is applied. For example, if additional information is voice information, it may be compressed by cutting off a high-frequency range using the human hearing characteristics to have a capacity which can be embedded in the image. If, however, additional information is character information, when the character information is considered as voice information and undergoes the same compression processing, information may be lost and it is impossible to restore the compressed information to the original character information. To prevent this, it is necessary to perform preprocessing in accordance with the contents of the additional information.

In this embodiment, preprocessing suitable for the additional information is executed by analyzing the contents of the additional information to be embedded in the image and switching contents of the preprocessing in accordance with the analysis result.

Figure 24:
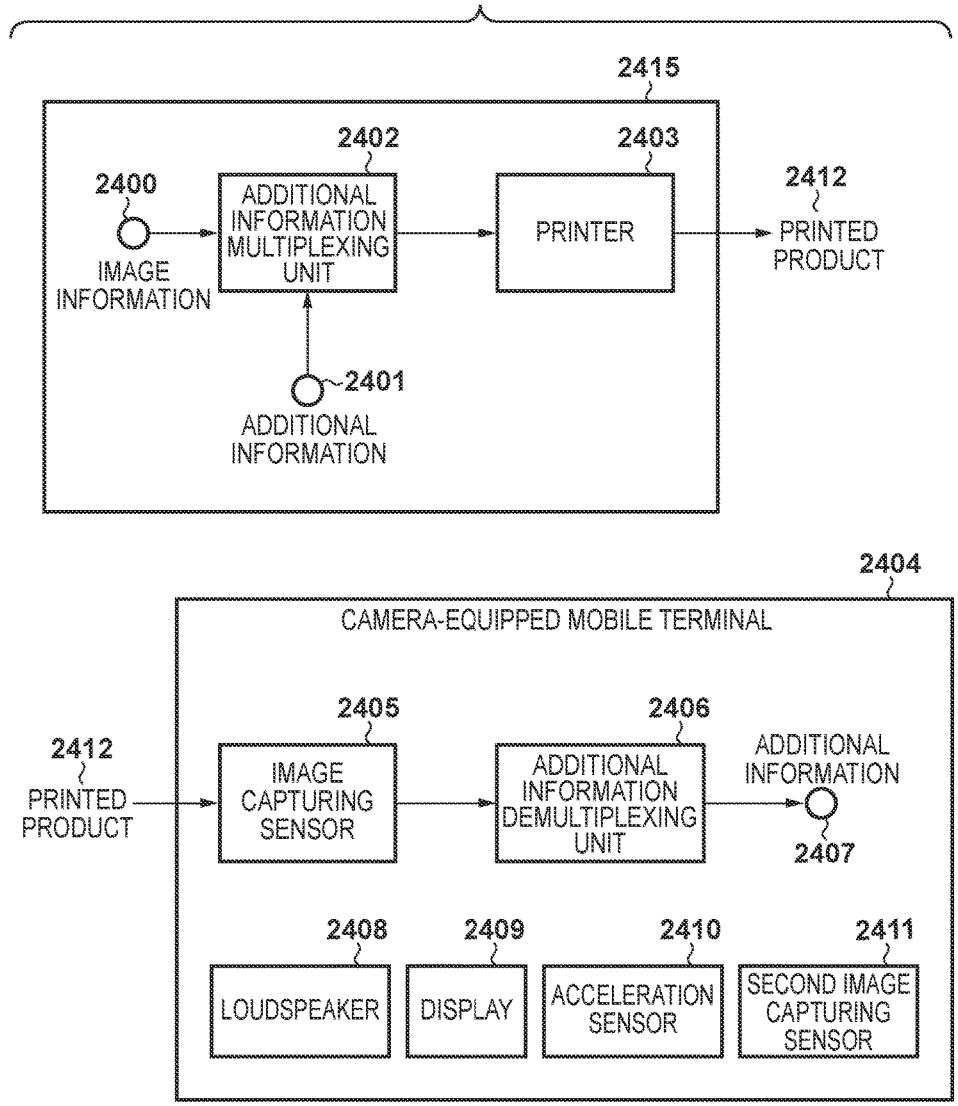
FIG. 24 is a block diagram showing an example of the configuration of an image processing system.

FIG. 24 is a block diagram showing the configuration of an image processing system. The image processing system according to this embodiment includes an image processing apparatus 2415 and a camera-equipped mobile terminal 2404. The image processing apparatus 2415 is a printing apparatus having a print function, and is, for example, an MFP (Multi Function Peripheral). The camera-equipped mobile terminal 2404 is, for example, a camera-equipped mobile phone, a camera-equipped smartphone, or a tablet PC.

In this embodiment, the image processing apparatus 2415 prints a printed product 2412 in which additional information has been multiplexed. The camera-equipped mobile terminal 2404 captures the printed product 2412 using an image capturing sensor 2405 (camera). Therefore, in this embodiment, the image processing apparatus 2415 and the camera-equipped mobile terminal 2404 may be communicable with each other via a wired or wireless network, or need not be connected to be communicable via a network or the like.

The image processing apparatus 2415 includes an additional information multiplexing unit 2402 for embedding additional information in the printed product 2412, and the camera-equipped mobile terminal 2404 includes an additional information demultiplexing unit 2406 for reading the multiplexed additional information from the printed product. The additional information multiplexing unit 2402 is implemented as, for example, application software or printer driver software for creating image information to be output to a printer 2403 (printer engine). The additional information multiplexing unit 2402 may also be implemented in a format incorporated in a copying machine, a facsimile, a printer main body, or the like as hardware or software. Furthermore, the additional information demultiplexing unit 2406 may be implemented by internal application software or hardware for demultiplexing additional information from an image shot by a digital steel camera. Note that this embodiment assumes that the additional information multiplexing unit 2402 and the printer 2403 are included in the image processing apparatus 2415. However, the additional information multiplexing unit 2402 and the printer 2403 may be separated into different apparatuses. For example, an information processing apparatus such as a PC or smartphone may include the additional information multiplexing unit 2402, and an image processing apparatus different from the above information processing apparatus may include the printer 2403.

In this embodiment, as will be described with reference to FIG. 25, the additional information multiplexing unit 2402 is formed by including an additional information preprocessing unit 2500 for analyzing the input additional information and performing preprocessing of multiplexing, a multiplexing processing unit 2501, and an additional information multiplexing control unit 2510 for controlling these units.

[Arrangement for Embedding Additional Information]

Multi-tone image information is input from an input terminal 2400, and additional information to be embedded in the image information is input from an input terminal 2401. This additional information is information different from the image information, for example, voice information, moving image information, character information, pieces of information such as the copyright, shooting date & time, shooting location, and user regarding the image, or completely different image information. Furthermore, the additional information may be included as part of image information formed as an image file.

The additional information multiplexing unit 2402 embeds (multiplexes) the additional information in the image information so as to be difficult to visually discriminate the embedded information. Along with multiplexing of the additional information, the additional information multiplexing unit 2402 quantizes the input multi-tone image information and performs preprocessing of multiplexing (to be described later with reference to FIG. 25).

The printer 2403 executes print processing based on the information created by the additional information multiplexing unit 2402. The printer 2403 is a printer for implementing, on the printed product 2412, a halftoning expression using pseudo-halftoning, such as an inkjet printer or laser printer.

Figure 29A:
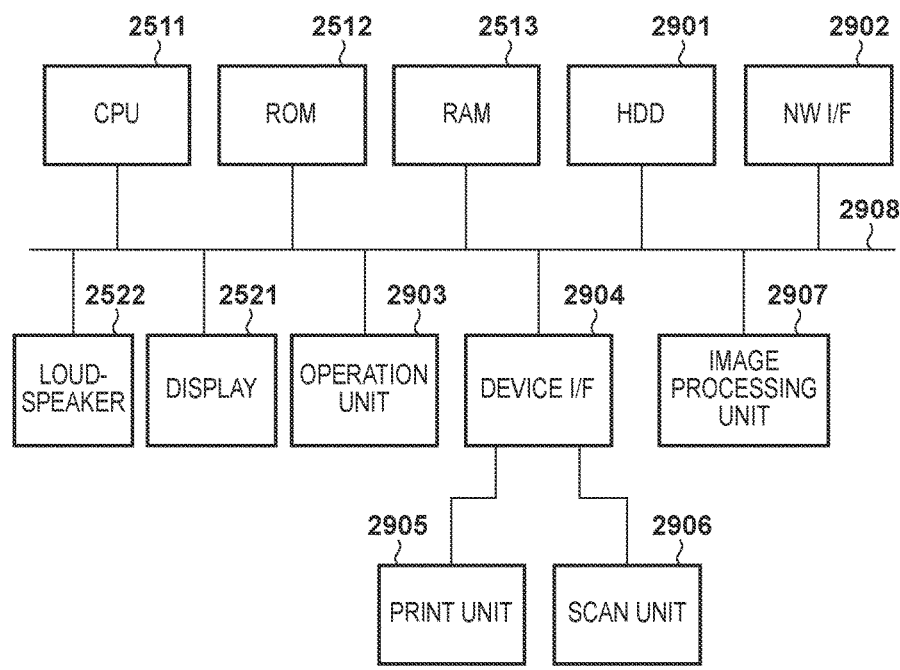
FIGS. 29A and 29B are block diagrams respectively showing the arrangements of an image processing apparatus and camera-equipped mobile terminal.

FIG. 29A is a block diagram showing the arrangement of the image processing apparatus 2415. A CPU 2511 is a processor for generally controlling the interior of the image processing apparatus 2415. The additional information multiplexing unit 2402 shown in FIG. 24 is implemented by, for example, the CPU 2511. A ROM 2512 and an HDD 2901 store the basic programs, control programs, various applications and data, and the like of the image processing apparatus 2415. For example, the CPU 2511 reads out the programs stored in the ROM 2512 into a RAM 2513, and executes them, thereby implementing an operation according to each embodiment. The RAM 2513 is also used as the working memory of the CPU 2511.

A network interface (NW I/F) 2902 has an arrangement corresponding to the network form such as a wired or wireless network. The NW I/F 2902 can be compatible with a plurality of kinds of wireless networks for different communication ranges. For example, the NW I/F 2902 can communicate with the camera-equipped mobile terminal 2404 by NFC (Near Field Communication) in a communication range of several cm.

A display 2521 displays each setting screen, a preview screen, or the like to the user. An operation unit 2903 includes, for example, a keyboard or touch panel, and can accept an operation instruction from the user.

A device I/F 2904 connects a print unit 2905 (print engine) and a scan unit 2906 to a system bus 2908. The print unit 2905 corresponds to the printer 2403 in FIG. 24. Although FIG. 29A shows the print unit 2905 and the scan unit 2906, another block such as a FAX may be connected to the device I/F 2904 in accordance with a function executable by the image processing apparatus 2415.

An image processing unit 2907 executes, for externally acquired data or data acquired from the scan unit 2906 or the like, image processing according to an application. For example, the image processing unit 2907 executes processing such as color space conversion, binarization, or image enlargement/reduction/rotation according to the printing method of the print unit 2905.

The respective blocks shown in FIG. 29A are communicably interconnected via the system bus 2908. An arrangement other than that shown in FIG. 29A may be adopted. For example, the system bus 2908 and an image data bus are connected via a bus bridge. In this case, for example, the device I/F 2904 is connected to the image data bus.

The input terminal 2400 shown in FIG. 24 is configured to input information from, for example, the network I/F 2902, and the input terminal 2401 is configured to input information from, for example, the network I/F 2902 or the operation unit 2903.

[Arrangement for Reading Additional Information]

A reading application executed on the camera-equipped mobile terminal 2404 shown in FIG. 24 reads information on the printed product 2412 using the image capturing sensor 2405, causes the additional information demultiplexing unit 2406 to demultiplex the additional information embedded in the printed product 2412, and outputs the additional information to an output terminal 2407. The output terminal 2407 is an interface for outputting the acquired additional information. For example, if the additional information is voice information, the output terminal 2407 outputs the information to a loudspeaker 2408 of the camera-equipped mobile terminal 2404. If the additional information is image information or character information, the output terminal 2407 outputs the information to a display 2409. The output terminal 2407 may output the information to an interface for outputting data to an external device. If the camera-equipped mobile terminal 2404 includes a plurality of image capturing sensors, the printed product 2412 may be shot by a second image capturing sensor 2411.

Figure 29B:
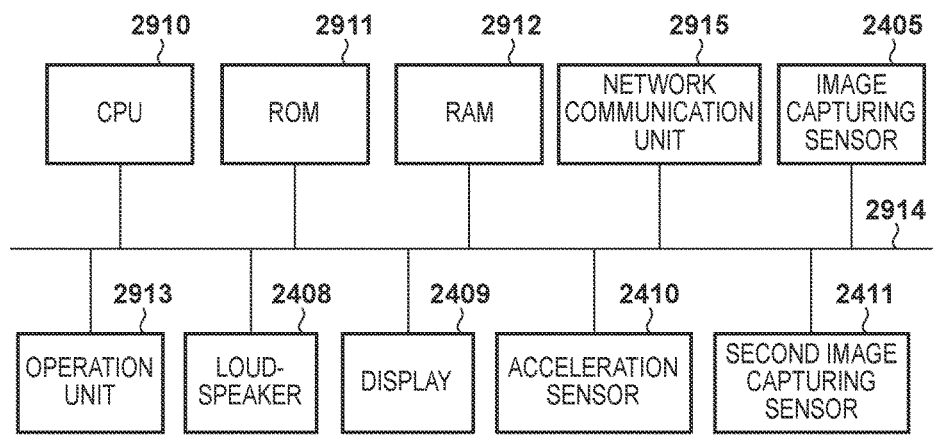

FIG. 29B is a block diagram showing the arrangement of the camera-equipped mobile terminal 2404. The camera-equipped mobile terminal 2404 includes components of a general-purpose information processing apparatus such as a CPU, a ROM, and a RAM. A CPU 2910 is a processor for generally controlling the interior of the camera-equipped mobile terminal 2404. The additional information demultiplexing unit 2406 shown in FIG. 24 is implemented by, for example, the CPU 2910. A ROM 2911 stores the basic programs, control programs, various applications and data, and the like of the camera-equipped mobile terminal 2404. For example, the CPU 2910 reads out the programs stored in the ROM 2911 into a RAM 2912, and executes them, thereby implementing an operation according to each embodiment. The RAM 2912 is also used as the working memory of the CPU 2910.

A network communication unit 2915 has an arrangement corresponding to the network form such as a wired or wireless network. The network communication unit 2915 can be compatible with a plurality of kinds of wireless networks for different communication ranges. For example, the network communication unit 2915 can communicate with the image processing apparatus 2415 by NFC (Near Field Communication) in a communication range of several cm.

A display 2409 displays each setting screen, a preview screen, or the like to the user. An operation unit 2913 includes, for example, hard keys, and can accept an operation instruction from the user. An acceleration sensor 2410 detects the orientation of the camera-equipped mobile terminal 2404. The respective blocks shown in FIG. 29B are communicably interconnected via a system bus 2914.

Figure 25:
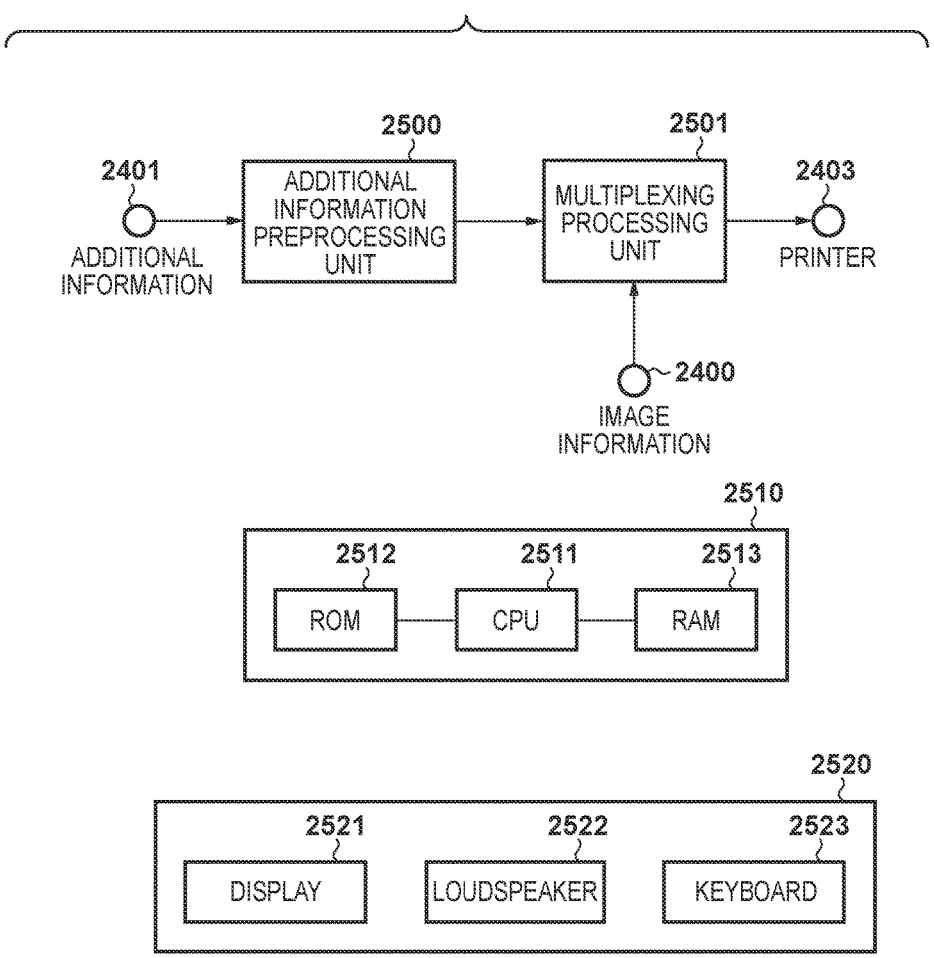
FIG. 25 is a block diagram showing the arrangement of an additional information multiplexing unit.

FIG. 25 is a block diagram showing the arrangement of the additional information multiplexing unit 2402. Before multiplexing by the multiplexing processing unit 2501, the additional information preprocessing unit 2500 performs predetermined preprocessing (to be described later) for the additional information input to the input terminal 2401. The multiplexing processing unit 2501 embeds, in the image information input to the input terminal 2400, the additional information having undergone the preprocessing by the additional information preprocessing unit 2500, and outputs the thus obtained image information to the printer 2403.

The additional information multiplexing control unit 2510 shown in FIG. 25 includes the CPU 2511, the ROM 2512, and the RAM 2513. If an error occurs in the processing result of the additional information preprocessing unit 2500 and the multiplexing processing unit 2501, the additional information multiplexing control unit 2510 stops the processing of the additional information multiplexing unit 2402, and notifies the operator of it through the display 2521 or the like. Note that the CPU 2511 is a processor for generally controlling the interior of the image processing apparatus 2415, as described above.

A user interface unit 2520 shown in FIG. 25 includes the display 2521, a loudspeaker 2522, and a keyboard 2523. The display 2521 corresponds to the display 2521 shown in FIG. 29A, and is used not only to display a notification to the user but also to preview character information or moving image information as additional information. The loudspeaker 2522 outputs a voice of voice information or moving image information as additional information. The keyboard 2523 corresponds to the operation unit 2903 shown in FIG. 29A, and is used for an instruction and selection from the user, and the user input of character information as additional information.

The operation of the additional information preprocessing unit 2500 will be described with reference to flowcharts shown in FIGS. 26A and 26B. The additional information multiplexing unit 2402 according to this embodiment discriminates four kinds of information, that is, character data, voice data, moving image data, and other data as additional information, and embeds the additional information in image data.

In step S2600, the CPU 2511 determines the data type of the additional information input to the input terminal 2401. This determination processing may be performed with reference to the header information of the additional information or may be performed by accepting designation from the user. In this embodiment, one of the four data types of character data, voice data, moving image data, and other data is determined. If the entity of the additional information cannot be specified, it is determined that an error has occurred, thereby terminating the processing of FIG. 26.

Figure 26A:
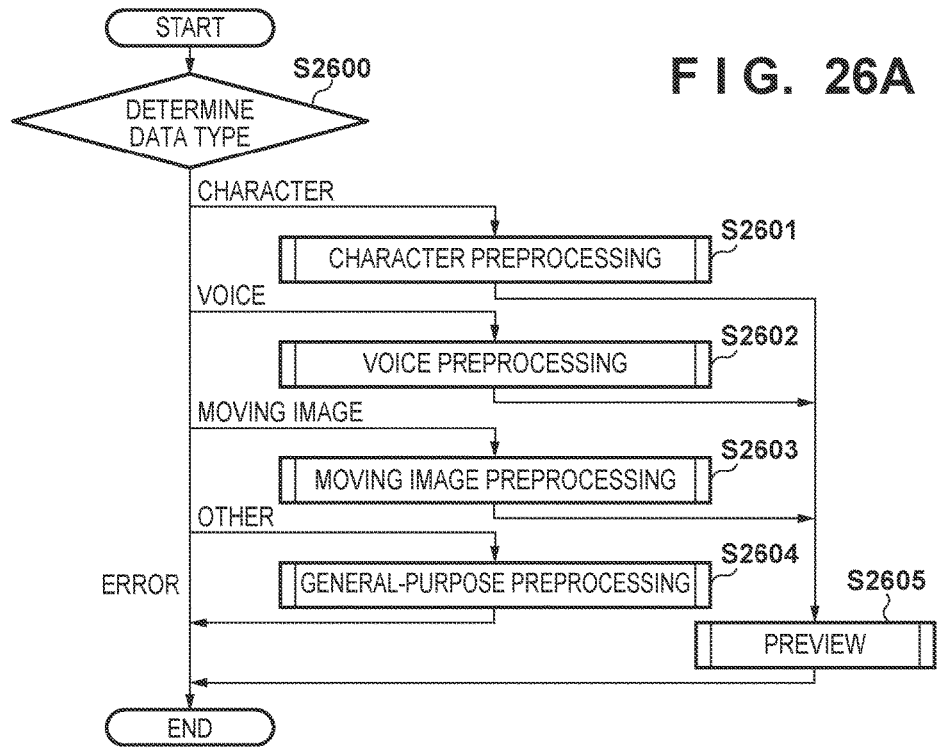
FIGS. 26A and 26B are flowcharts illustrating the processing of the additional information preprocessing unit.

FIG. 26A is a flowchart illustrating the overall processing of the additional information preprocessing unit 2500. Each of steps S2601 to S2603 indicates preprocessing when the data type is character data, voice data, or moving image data. If it is determined in step S2600 that the data type of the additional information is character data, the process advances to step S2601 to perform character preprocessing. If it is determined in step S2600 that the data type of the additional information is voice data, the process advances to step S2602 to perform voice preprocessing. If it is determined in step S2600 that the data type of the additional information is moving image data, the process advances to step S2603 to perform moving image preprocessing. If it is determined in step S2600 that the data type of the additional information is other data, the process advances to step S2604 to perform predetermined general-purpose preprocessing.

In step S2605, the CPU 2511 previews the additional information which has undergone the preprocessing in step S2601, S2602, or S2603, or listens to the additional information when the additional information is voice data. The preview or listening is provided to the operator (user) as contents equivalent to the additional information demultiplexed from the image by the additional information demultiplexing unit 2406 (to be described later). Therefore, based on the preview or listening, the user can select whether to shift the process from the additional information preprocessing unit 2500 to the multiplexing processing unit 2501, that is, whether to stop the multiplexing processing. Note that if NO is determined in step S2711 of FIG. 27 (to be described later), the processing in step S2605 may be skipped.

If the processing in each of steps S2601 to S2604 normally ends, the process shifts to the subsequent multiplexing processing unit 2501; otherwise, the processing result of the additional information preprocessing unit 2500 indicates an error, and thus the processing of the additional information multiplexing unit 2402 is stopped.

Figure 26B:
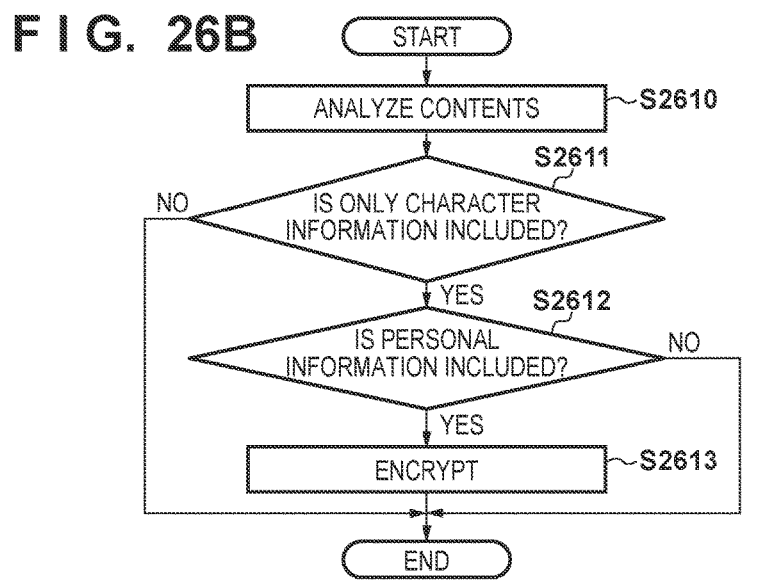

FIG. 26B is a flowchart illustrating the processing in step S2601 when the additional information is character data. In step S2610, the CPU 2511 analyzes information included in the additional information. In step S2611, the CPU 2511 determines whether the additional information includes only character data. If it is determined that only character data is included, the process advances to step S2612; otherwise, it is determined that an error has occurred, thereby terminating the processing in step S2601.

In step S2612, the CPU 2511 determines whether the character data includes personal information. If it is determined that personal information is included, the process advances to step S2613; otherwise; the processing shown in FIG. 26B ends. In this case, it is determined that the processing has normally ended, and the CPU 2511 advances to the processing in step S2605. In step S2612, the CPU 2511 may determine whether personal information is included, by general pattern matching or explicit designation by the user.

In step S2613, the CPU 2511 encrypts the character data. The CPU 2511 encrypts the character data by, for example, a general encryption method. After that, the CPU 2511 terminates the processing shown in FIG. 26B. In this case, it is determined that the processing has normally ended, and the process advances to step S2605.

Figure 27A:
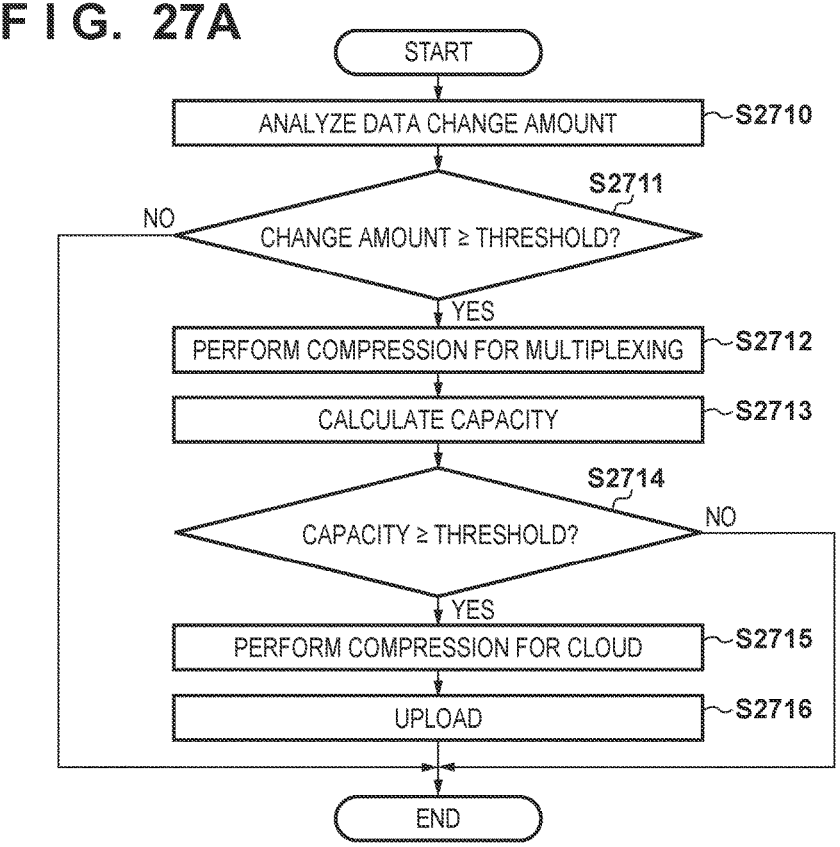
FIGS. 27A and 27B are flowcharts illustrating the processing of the additional information preprocessing unit.

FIG. 27A is a flowchart illustrating the processing in step S2602 when the additional information is voice data. In step S2710, the CPU 2511 analyzes a change amount of the voice data. The processing in step S2710 aims at detecting data which is ineffective as additional information, such as silence or noise. In this embodiment, if output values in time series are simply at levels falling within a predetermined range, a change amount of zero is determined. However, as for the voice data, determination may be performed by a method of obtaining a change in output strength for each frequency from a power spectrum having undergone Fourier transform.

In step S2711, the CPU 2511 determines whether the data change amount analyzed in step S2710 is equal to or larger than a threshold. If it is determined that the data change amount is equal to or larger than the threshold, it is determined that the additional information is effective data and the process advances to step S2712; otherwise, it is determined that the additional information is not effective data, and an error has occurred, thereby terminating the processing shown in FIG. 27A. In this embodiment, for example, the threshold is set to 10 dB, and it is determined whether the change amount is equal to or larger than 10 dB. The threshold is not limited to this, and other values may be used as long as it is possible to determine whether the additional information is effective data.

In step S2712, the CPU 2511 compresses the additional information in accordance with a multiplexing setting. In this embodiment, for example, Speex defined in RFC 5574 is used as a compression algorithm, and a quality setting is fixed to 1 (VBR), thereby performing compression. In step S2713, the CPU 2511 calculates the data capacity of the voice data compressed in step S2712.

In step S2714, the CPU 2511 determines whether the data capacity calculated in step S2713 is equal to or larger than a threshold. In this embodiment, for example, it is determined whether the data capacity after compression is equal to or larger than 4 Kbytes. This is because as the data capacity is larger, an area necessary for the multiplexing processing by the multiplexing processing unit 2501 (to be described later) increases. If it is determined that the data capacity is smaller than 4 Kbytes, it is possible to embed the additional information in the image. Thus, the processing in step S302 ends, and the compressed additional information is sent as preprocessed additional information to the multiplexing processing unit 2501. On the other hand, if the data capacity is equal to or larger than 4 Kbytes, the process advances to step S2715.

In this embodiment, if it is determined that the data capacity of the additional information is equal to or larger than 4 Kbytes, it is determined that the entity of the additional information cannot be embedded in the image, and the entity of the additional information is uploaded to a predetermined cloud server on a network. At this time, instead of the additional information, link information is embedded as storage destination information in the image information.

In step S2715, the CPU 2511 performs compression processing for uploading the additional information to the cloud server. In this embodiment, compression is performed at 128 Kbps of AAC defined in ISO/IEC.

In step S2716, the CPU 2511 uploads, to the predetermined server, the additional information compressed in step S2715. The upload target server may be preset or designated by the operator at this timing. Upon completion of uploading, the CPU 2511 acquires the link information, terminates the processing in step S2602, and sends the link information as preprocessed additional information to the multiplexing processing unit 2501. In this embodiment, Speex and AAC are used for voice compression. However, algorithms of other compression methods may be used.

After the processing in step S2716, the processing shown in FIG. 27A ends. In this case, it is determined that the processing has normally ended, and the process advances to step S2605.

Figure 27B:
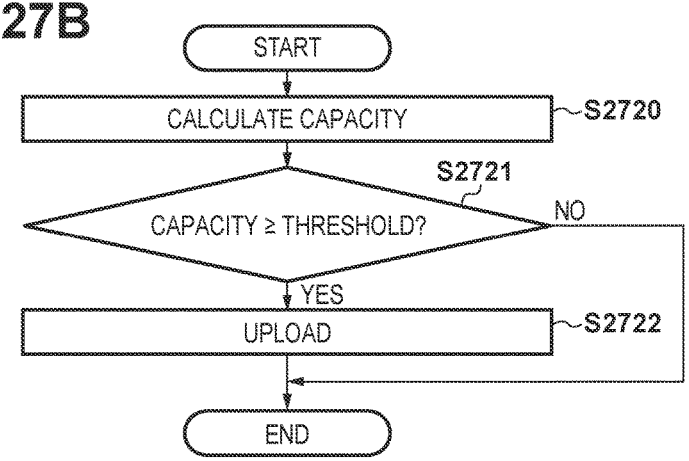

FIG. 27B is a flowchart illustrating the processing in step S2603 or S2604 when the additional information is moving image data or general-purpose data. In this embodiment, the processes in steps S2603 and S2604 are different in options of an upload destination (to be described later) but are the same in terms of other operations, and thus will be described together.

In step S2720, the CPU 2511 calculates the data capacity of the additional information. In step S2721, it is determined whether the data capacity calculated in step S2720 is equal to or larger than a threshold. The threshold for the determination processing is, for example, 4 Kbytes. If it is determined that the data capacity is smaller than 4 Kbytes, it is determined that the additional information can be embedded in the image. The processing in step S2603 or S2604 ends, and the additional information is sent as the preprocessed additional information to the multiplexing processing unit 2501. On the other hand, if it is determined that the data capacity is equal to or larger than 4 Kbytes, the process advances to step S2722.

In step S2722, the additional information is uploaded to a predetermined server, and link information is acquired as storage destination information, similarly to step S2716. At this time, for the processing in step S2603, selection can be made by adding, as a server option, a shared server dedicated for moving images. Upon completion of uploading, the CPU 2511 acquires the link information, and then terminates the processing in step S2603 or S2604, thereby sending the link information as the preprocessed additional information to the multiplexing processing unit 2501.

After the processing in step S2722, the processing of FIG. 27B ends. In this case, the processing normally ends. If the processing of FIG. 27B corresponds to step S2603, the process advances to step S2605. Alternatively, if the processing of FIG. 27B corresponds to step S2604, the processing of FIG. 26 ends and the process shifts to the multiplexing processing unit 2501.

Figure 28:
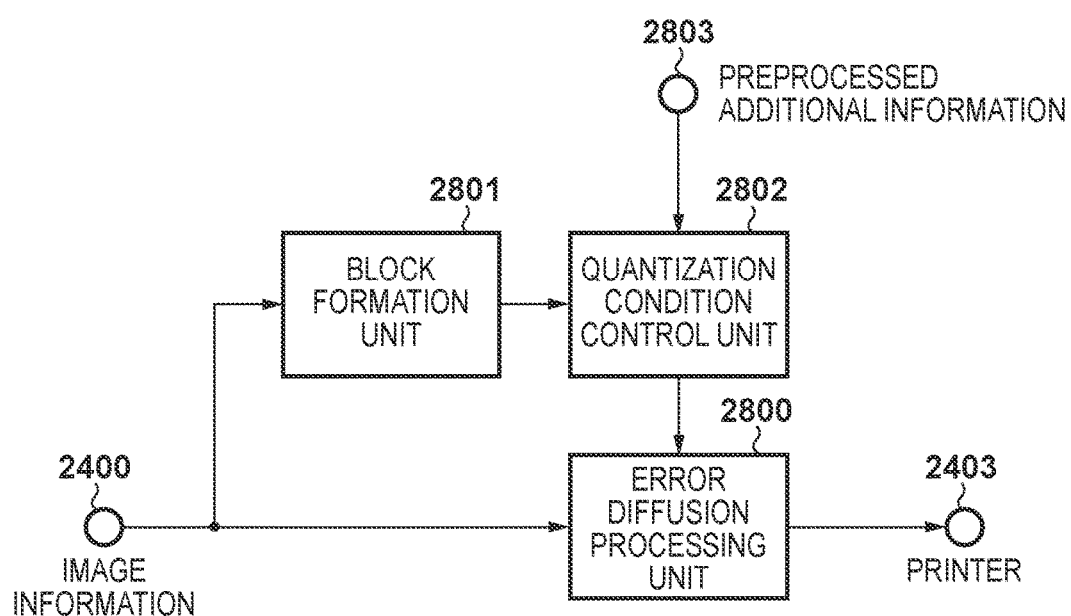
FIG. 28 is a block diagram showing an arrangement of performing embedding included in the additional information multiplexing unit.

FIG. 28 is a block diagram showing an arrangement of performing embedding included in the additional information multiplexing unit 2402 shown in FIG. 24. An error diffusion processing unit 2800 performs pseudo-halftoning using a general error diffusion method to convert the image information input to the input terminal 2400 into a quantization level lower than the number of input tones, thereby areally expressing the tonality based on the quantized values of a plurality of pixels.

A block formation unit 2801 segments the image information input to the input terminal 2400 into predetermined regions (blocks). In block formation performed by the block formation unit 2801, the image information may be segmented into rectangles or regions other than rectangles.

A quantization condition control unit 2802 controls to change, based on the additional information which has been preprocessed by the additional information preprocessing unit 2500 and input via an input terminal 2803, a quantization condition for each block region formed by the block formation unit 2801. The quantization condition control unit 2802 changes a quantization condition for each block based on the additional information input to the input terminal 2401.

The overall processing including the quantization condition control unit 2802 is the same as that described with reference to FIGS. 5 to 7. The additional information demultiplexing unit 2406 has the same arrangement as that shown in FIG. 8 and the processing of the additional information demultiplexing unit 2406 is the same as that described with reference to FIGS. 8 to 14. In this embodiment, the processes shown in FIGS. 5 and 12 are implemented when the CPU 2511 of the image processing apparatus 2415 reads out the programs stored in the ROM 2512 into the RAM 2513, and executes them.

As described above, according to this embodiment, preprocessing suitable for additional information to be embedded in an image can be executed by analyzing the contents of the additional information and switching the contents of the preprocessing in accordance with the analysis result.

Note that some or all of the above-described embodiments may be used in combination, as needed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-198927, filed Oct. 6, 2015, and Japanese Patent Application No. 2015-198926, filed Oct. 6, 2015, which are hereby incorporated by reference herein in their entirety.

What is claimed is:

1. An information processing method performed by at least one processor executing a program stored in a memory, the method comprising:
    performing first multiplexing of multiplexing pieces of information in a plurality of portions on an image respectively, by the at least one processor; and
    performing second multiplexing of multiplexing, in a portion of the plurality of portions where an edge amount is smaller than a threshold, image information which sets the edge amount to be equal to or more than the threshold, by the at least one processor.

2. The method according to claim 1, wherein in the second multiplexing, if a maximum edge amount of edge amounts of the plurality of portions is not smaller than the threshold, the image information is not multiplexed.

3. The method according to claim 1, wherein in the second multiplexing, whether to multiplex the image information is controlled in accordance with a type of an AF function implemented in a device which captures a printed product printed with an image in which the information has been multiplexed in the first multiplexing and the image information has been multiplexed in the second multiplexing.

4. The method according to claim 3, wherein in the second multiplexing, if the type of the AF function is contrast AF, the image information is multiplexed.

5. The method according to claim 3, wherein in the second multiplexing, if the type of the AF function is phase difference AF, the image information is not multiplexed.

6. The method according to claim 1, wherein in the second multiplexing, if a printing apparatus for printing an image in which the information has been multiplexed in the first multiplexing and the image information has been multiplexed in the second multiplexing has a capability of multiplexing invisible information, the information is multiplexed as the image information by one of visible multiplexing, invisible multiplexing, and multiplexing using visible multiplexing and invisible multiplexing.

7. The method according to claim 6, wherein in the second multiplexing, if the printing apparatus has no capability of multiplexing invisible information, visible information is multiplexed.

8. The method according to claim 1, wherein in the second multiplexing, if an information amount of the information is equal to or more than a threshold, the image information is multiplexed.

9. The method according to claim 8, wherein in the second multiplexing, if the information amount is smaller than the threshold, the image information is not multiplexed.

10. The method according to claim 1, wherein an instruction by a user, capable of instructing the second multiplexing is accepted.

11. The method according to claim 1, wherein an image in which the information has been multiplexed in the first multiplexing and the image information has been multiplexed in the second multiplexing is output to a printing apparatus.

12. The method according to claim 1, wherein in the second multiplexing, if edge amounts of the plurality of portions are smaller than the threshold, the image information is multiplexed in one of the plurality of portions and is not is multiplexed in another portion of the plurality of portions.

13. The method according to claim 12, wherein in the second multiplexing, if the edge amounts of the plurality of portions are smaller than the threshold, the image information is multiplexed in a portion where a minimum edge amount of the edge amounts of the plurality of portions has been obtained.

14. The method according to claim 1, wherein in the first multiplexing, the pieces of information is multiplexed as invisible information.

15. The method according to claim 14, wherein in the second multiplexing, the image information as visible information is multiplexed.

16. The method according to claim 15, wherein the image information is two-dimensional barcode.

17. The method according to claim 14, wherein in the second multiplexing, the image information as invisible information is multiplexed.

18. The method according to claim 1, wherein in the second multiplexing, the image information is multiplexed in the image in which the pieces of information has been multiplexed in the first multiplexing.

19. The method according to claim 1, further comprising performing analysis, of the image, relating to an edge in the image, by the at least one processor, and determining edge amount of a portion on the image, by the at least one processor, wherein in the second multiplexing, the image information is multiplexed in the portion which the edge amount determined in the determining is smaller than the threshold.

20. An information processing method performed by at least one processor executing a program stored in a memory, the method comprising:

acquiring captured images of regions respectively corresponding to a plurality of portions on an image in a printed material printed with the image in which pieces of information have been respectively multiplexed in the plurality of portions, and image information which sets an edge amount to be equal to or more than a threshold has been multiplexed in a portion of the plurality of portions where an edge amount is smaller than the threshold, by the at least one processor; and extracting the pieces of information from the captured images, by the at least one processor.

21. An information processing apparatus comprising:

a memory which stores a program; and at least one processor which executes the program stored in the memory, wherein the at least one processor multiplexes pieces of information in a plurality of portions on an image respectively; and the at least one processor multiplexes, in a portion of the plurality of portions where an edge amount is smaller than a threshold, image information which sets the edge amount to be equal to or more than the threshold.

22. A non-transitory computer-readable storage medium storing a program executable by at least one processor, the program causing the at least one processor to:

multiplex pieces of information in a plurality of portions on an image respectively; and multiplex, in a portion of the plurality of portions where an edge amount is smaller than a threshold, image information which sets the edge amount to be equal to or more than the threshold.

* * * * *